(12) United States Patent
Okamoto et al.

(10) Patent No.: US 11,358,844 B2
(45) Date of Patent: Jun. 14, 2022

(54) INDUSTRIAL VEHICLE REMOTE OPERATION SYSTEM, INDUSTRIAL VEHICLE, COMPUTER-READABLE STORAGE MEDIUM STORING INDUSTRIAL VEHICLE REMOTE OPERATION PROGRAM, AND INDUSTRIAL VEHICLE REMOTE OPERATION METHOD

(71) Applicant: KABUSHIKI KAISHA TOYOTA JIDOSHOKKI, Kariya (JP)

(72) Inventors: Hironobu Okamoto, Aichi-ken (JP); Takehito Sakakibara, Aichi-ken (JP); Koji Hika, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 246 days.

(21) Appl. No.: 16/759,550

(22) PCT Filed: Oct. 19, 2018

(86) PCT No.: PCT/JP2018/039103
§ 371 (c)(1),
(2) Date: Apr. 27, 2020

(87) PCT Pub. No.: WO2019/087835
PCT Pub. Date: May 9, 2019

(65) Prior Publication Data
US 2021/0221664 A1    Jul. 22, 2021

(30) Foreign Application Priority Data
Oct. 31, 2017    (JP) .............................. JP2017-210711

(51) Int. Cl.
*B66F 9/075* (2006.01)
*H04W 4/80* (2018.01)
(Continued)

(52) U.S. Cl.
CPC ....... *B66F 9/07581* (2013.01); *G05D 1/0022* (2013.01); *G05D 1/0055* (2013.01);
(Continued)

(58) Field of Classification Search
CPC ..... B66F 9/07581; B66F 9/24; G05D 1/0022; G05D 1/0055; G05D 2201/0216;
(Continued)

(56) References Cited

U.S. PATENT DOCUMENTS 8,576,116 B2 * 11/2013 Matsuo ................... G01S 7/292
342/194
2013/0099959 A1 * 4/2013 Matsuo ................... G01S 7/292
342/189

(Continued)

FOREIGN PATENT DOCUMENTS

| JP | 2002-104800 A | 4/2002 |
|---|---|---|
| JP | 2005-269000 A | 9/2005 |

(Continued)

*Primary Examiner* — Muhammad Shafi
(74) *Attorney, Agent, or Firm* — Sughrue Mion, PLLC

(57) ABSTRACT

An industrial vehicle remote operation system includes an industrial vehicle that includes a vehicle communication unit performing wireless communication; and a remote operation device that includes a remote communication unit performing wireless communication with the vehicle communication unit. The industrial vehicle includes: a delay time calculation unit calculating a delay time corresponding to a difference between a reception period required for the vehicle communication unit to receive a plurality of remote operation signals and a generation period required for generating the plurality of remote operation signals; a communication delay determination unit performing a communication delay determination for determining whether or not a communication delay has been caused based on the delay time; and a communication delay handling control unit executing communication delay handling control corre- (Continued)

sponding to the communication delay when it is determined that the communication delay has been caused in the communication delay determination.

13 Claims, 10 Drawing Sheets

(51) Int. Cl.
*H04W 4/40* (2018.01)
*G05D 1/00* (2006.01)
(52) U.S. Cl.
CPC ............... *H04W 4/40* (2018.02); *H04W 4/80* (2018.02); *G05D 2201/0216* (2013.01)
(58) Field of Classification Search
CPC . G05D 1/00; H04W 4/40; H04W 4/80; H04Q 9/00
USPC .......................................................... 701/50
See application file for complete search history.

(56) References Cited

U.S. PATENT DOCUMENTS

2015/0099977 A1* 4/2015 Kim .................... G01S 15/8925
600/447
2017/0293295 A1* 10/2017 Tani .................... G05D 1/0055

FOREIGN PATENT DOCUMENTS

JP  2016-071585 A  5/2016
JP  2017-049903 A  3/2017

* cited by examiner

INDUSTRIAL VEHICLE REMOTE OPERATION SYSTEM, INDUSTRIAL VEHICLE, COMPUTER-READABLE STORAGE MEDIUM STORING INDUSTRIAL VEHICLE REMOTE OPERATION PROGRAM, AND INDUSTRIAL VEHICLE REMOTE OPERATION METHOD

CROSS-REFERENCE TO RELATED APPLICATION

This application is a National Stage of International Application No. PCT/JP2018/039103 filed on Oct. 19, 2018, claiming priority based on Japanese Patent Application No. 2017-210711 filed on Oct. 31, 2017, the contents of all of which are incorporated herein by reference in their entirety.

TECHNICAL FIELD

The present invention relates to an industrial vehicle remote operation system, an industrial vehicle, a computer-readable storage medium storing an industrial vehicle remote operation program, and an industrial vehicle remote operation method.

BACKGROUND ART

Patent Document 1 describes that a remote control device which is a remote operation device for remotely operating a forklift truck as an industrial vehicle remotely operates load-handling work of the forklift truck from a position away from the forklift truck.

CITATION LIST

Patent Document

Patent Document 1: Japanese Patent Application Publication No. 2002-104800

SUMMARY OF INVENTION

Technical Problem

It is considered herein that wireless communication is performed between a remote operation device and an industrial vehicle in a configuration in which the industrial vehicle is remotely operated using the remote operation device. In this case, a communication delay may be caused depending on a communication environment, and responsiveness of the industrial vehicle may be lowered. As a result, operability may be lowered, for example.

The present invention has been made in view of the above-described circumstances. An object of the present invention is to provide an industrial vehicle remote operation system, an industrial vehicle, a computer-readable storage medium storing an industrial vehicle remote operation program, and an industrial vehicle remote operation method each configured to handle a communication delay.

Solution to Problem

An industrial vehicle remote operation system achieving the above object includes: an industrial vehicle that includes a vehicle communication unit configured to perform wireless communication; and a remote operation device that includes a remote communication unit configured to perform wireless communication with the vehicle communication unit, and that is used for remotely operating the industrial vehicle. The industrial vehicle remote operation system is characterized in that: the remote operation device includes a signal generation unit configured to repeatedly execute a signal generation process for generating a remote operation signal used for a remote operation of the industrial vehicle; the remote communication unit is configured to sequentially transmit the remote operation signal generated by the signal generation unit to the vehicle communication unit; the industrial vehicle operates based on the remote operation signal received by the vehicle communication unit; and the industrial vehicle includes a delay time calculation unit configured to calculate a delay time corresponding to a difference between a reception period required for the vehicle communication unit to receive a plurality of the remote operation signals and a generation period required for generating the plurality of remote operation signals, a communication delay determination unit configured to perform a communication delay determination for determining whether or not a communication delay has been caused based on the delay time, and a communication delay handling control unit configured to execute communication delay handling control corresponding to the communication delay when it is determined that the communication delay has been caused in the communication delay determination.

According to this configuration, the remote operation signal generated by the signal generation unit is transmitted from the remote communication unit to the vehicle communication unit, and received by the vehicle communication unit. Thereafter, the industrial vehicle performs a motion based on the remote operation signal.

In this configuration, the communication delay determination is made based on the delay time corresponding to the difference between the reception period and the generation period associated with a plurality of the remote operation signals. When it is determined that a communication delay has been caused based on the communication delay determination, communication delay handling control is performed. In this manner, it is possible to manage the communication delay.

In particular, according to this configuration, the communication delay determination is performed using the delay time corresponding to the difference between the generation period and the reception period associated with a plurality of the remote operation signals. Accordingly, accuracy in determining whether or not a communication delay has been caused may improve more than in a configuration in which communication delay determination is made using only one remote operation signal.

Moreover, the remote operation signal is adopted as a signal used for the communication delay determination. In this case, the communication delay determination is made based on the delay condition of the remote operation signal which is actually used for the remote operation. Accordingly, the communication delay determination suitable for responsiveness of the industrial vehicle is achievable.

The industrial vehicle remote operation system preferably has a following configuration. The remote operation signal of the industrial vehicle remote operation system includes remote time information that includes a setting of generated time of the remote operation signal. The remote operation device includes a remote time recognition unit configured to recognize time. The generated time is set based on a recognition result obtained by the remote time recognition unit. The industrial vehicle includes a vehicle time recognition unit configured to recognize time, a received time recognition unit configured to recognize a received time of the remote operation signal based on a recognition result obtained by the vehicle time recognition unit, and the delay time calculation unit calculates the delay time corresponding to a difference between the reception period that is based on the received time recognized by the received time recognition unit and the generation period that is based on the generated time of the remote time information included in the remote operation signal.

According to this configuration, the delay time is a parameter corresponding to the difference between the reception period that is based on the received time and the generation period based on the generated time of the remote time information included in the remote operation signal. The received time is recognized using the vehicle time recognition unit, while the generated time is recognized using the remote time recognition unit. In this case, the delay time is not a difference between times but a difference between periods. In this case, the influence of the time difference between the time recognition units on the accumulated delay time is small. Accordingly, a drop of accuracy of the communication delay determination caused by the time difference between the time recognition units may decrease.

The industrial vehicle remote operation system preferably has a following configuration. The delay time calculation unit includes an interval recognition unit configured to recognize a generation interval and a reception interval of the remote operation signal based on the generated time of the remote time information included in the remote operation signal and the received time recognized by the received time recognition unit each time the vehicle communication unit receives the remote operation signal, a unit delay time calculation unit configured to calculate a unit delay time associated with one remote operation signal based on the generation interval and the reception interval that are recognized by the interval recognition unit, and an accumulated delay time update unit configured to update an accumulated delay time as the delay time based an the unit delay time each time the unit delay time is calculated. The communication delay determination unit performs the communication delay determination based on the accumulated delay time.

According to this configuration, the communication delay determination is made based on the communication environment up to the current time each time the vehicle communication unit receives the remote operation signal. Accordingly, the communication delay determination may be performed in a preferable manner, and improvement of the accuracy of the communication delay determination, and improvement of responsiveness to the communication delay may be achievable.

The industrial vehicle remote operation system preferably has a following configuration. The delay time calculation unit includes a generation period recognition unit configured to recognize the generation period based on the generated time of the remote time information included in the remote operation signal, and a reception period recognition unit configured to recognize the reception period that is based on the received time recognized by the received time recognition unit. The delay time is calculated based on the reception period and the generation period.

According to this configuration, the delay time may be calculated relatively easily.

The industrial vehicle remote operation system preferably has a following configuration. The industrial vehicle includes a communication error determination unit configured to determine that a communication error has been caused when a next remote operation signal is not received within a communication error period after the remote operation signal is received. The communication delay determination unit is configured to determine that the communication delay has been caused when the delay time is equal to or longer than a delay time threshold that is shorter than the communication error period.

This configuration performs both the determination concerning a communication error for determining whether or not transmission and reception of the remote operation signals have been normally performed based on transmission and reception of one of the remote operation signals, and the communication delay determination for determining whether or not a communication delay has been caused based on transmission and reception of a plurality of the remote operation signals. Accordingly, this configuration detects an abnormality that transmission and reception of the remote operation signal is difficult to perform, and an abnormality that a delay is continuously caused even in a state where transmission and reception of the remote operation signal is performed. In particular, the delay time threshold is shorter than the communication error period. Accordingly, this configuration detects, in a preferable manner, such a communication delay which is not determined as a communication error but continuously causes a delay of transmission and reception of the remote operation signal.

The industrial vehicle remote operation system preferably includes a following configuration. The remote operation device includes a transmission buffer that is configured to store a plurality of the remote operation signals and for which the generated remote operation signals are sequentially set. The remote communication unit sequentially transmits the remote operation signals set for the transmission buffer in a transmittable state where the remote operation signal is transmittable, and wait for a shift to the transmittable state without transmission of the remote operation signal in a state other than the transmittable state.

This configuration waits for the shift to the transmittable state without transmission of the remote operation signal when the current state is not the transmittable state as a result of an influence of other communication or the like, for example. Even in this case, the remote operation signals are sequentially generated. Accordingly, the remote operation signals are sequentially set for the transmission buffer. Thereafter, the remote operation signals are sequentially transmitted based on a shift to the transmittable state. In this manner, the remote operation signal not transmitted in the crowded communication environment is reduced.

In addition, according to this configuration, a small number of the remote operation signals are temporarily set for the transmission buffer when the current state shifts to a state not transmittable as a result of a temporary communication delay, Thereafter, the small number of the remote operation signals set during the state not transmittable are sequentially transmitted by a shift to the transmittable state as a result of cancellation of the communication delay. In this case, the reception period required for receiving the plurality of remote operation signals including those signals received after the cancellation of the communication delay is substantially equal to or close to the generation period required for generating the plurality of remote operation signals as a whole. Accordingly, the presence of a communication delay is unlikely to be determined by the communication delay determination. Accordingly, an erroneous determination that a communication delay has been caused even after cancellation of the communication delay may decrease.

The communication delay handling control of the industrial vehicle remote operation system preferably includes control that issues a notification that the communication delay has been caused in the remote operation device.

According to this configuration, an operator may recognize the presence of the communication delay. Accordingly, the operator may be prompted to take action corresponding to the communication delay, such as a temporary stop of a remote operation and a stop of other communication.

The communication delay handling control of the industrial vehicle remote operation system preferably includes remote operation stop control that stops a remote operation by the remote operation device.

According to this configuration, continuation of the remote operation in the presence of the communication delay may decrease, wherefore reduction of an erroneous operation caused by the communication delay may be achievable.

The industrial vehicle remote operation system preferably has a following configuration. The communication delay determination unit determines that the communication delay has been caused when the delay time is equal to or longer than a first delay time threshold. The communication delay handling control unit issues a notification that the communication delay has been caused as the communication delay handling control, and continues the remote operation by the remote operation device, when the delay time is shorter than a second delay time threshold that is longer than the first delay time threshold, and performs remote operation stop control that stops the remote operation by the remote operation device as the communication delay handling control, when the delay time is equal to or longer than the second delay time threshold.

According to this configuration, a warning notification is issued as the communication delay handling control when the delay time is shorter than the second delay time threshold. However, remote operation stop control is performed as the communication delay handling control when the delay time is equal to or longer than the second delay time threshold. In this manner, the communication delay handling control executed may be changed in accordance with the communication delay condition.

In particular, according to this configuration, the warning notification is performed before a stop of the remote operation. In this case, the operator may recognize the communication delay at a stage prior to the stop of the remote operation, and handle the communication delay. Accordingly, the operator may avoid such a surprise that the remote operation is suddenly stopped due to a communication delay.

A wireless communication format of each of the remote communication unit and the vehicle communication unit of the industrial vehicle remote operation system is preferably Wi-Fi.

According to this configuration, remote operations may be achieved using a general-purpose wireless communication format. Wi-Fi herein is a general-purpose wireless communication format, and therefore is likely to be also used for other communication. Accordingly, a communication delay is easily caused. However, this configuration may handle a communication delay which is easily caused when Wi-Fi is adopted. Accordingly, remote operations using Wi-Fi may be achievable in a preferable manner.

An industrial vehicle achieving the above object includes a vehicle communication unit configured to perform wireless communication with a remote communication unit of a remote operation device configured to repeatedly generate a remote operation signal used for a remote operation, and receives the remote operation signal repeatedly transmitted from the remote communication unit, and the industrial vehicle is configured to operate based on the remote operation signal. The industrial vehicle is characterized by including: a delay time calculation unit configured to calculate a delay time corresponding to a difference between a reception period required for the vehicle communication unit to receive a plurality of the remote operation signals and a generation period required for generating the plurality of remote operation signals; a communication delay determination unit configured to perform a communication delay determination for determining whether or not a communication delay has been caused based on the delay time; and a communication delay handling control unit configured to execute communication delay handling control corresponding to the communication delay when it is determined that the communication delay has been caused in the communication delay determination.

A computer-readable storage medium storing therein an industrial vehicle remote operation program achieving the above object is for use in an industrial vehicle remote operation system configured to perform, by using a remote operation device, a remote operation of an industrial vehicle that includes a vehicle communication unit configured to perform wireless communication and to receive a remote operation signal used for the remote operation, and is configured to operate based on the remote operation signal received by the vehicle communication unit. The remote operation device includes a signal generation unit configured to repeatedly execute a signal generation process for generating the remote operation signal, and a remote communication unit configured to perform wireless communication with the vehicle communication unit and sequentially transmit the remote operation signal to the vehicle communication unit. The industrial vehicle remote operation program is characterized in that the program causes the industrial vehicle to function as: a delay time calculation unit configured to calculate a delay time corresponding to a difference between a reception period required for the vehicle communication unit to receive a plurality of the remote operation signals and a generation period required for generating the plurality of remote operation signals; a communication delay determination unit configured to perform a communication delay determination for determining whether or not a communication delay has been caused based on the delay time; and a communication delay handling control unit configured to execute communication delay handling control corresponding to the communication delay when it is determined that the communication delay has been caused in the communication delay determination.

An industrial vehicle remote operation method achieving the above object remotely operates an industrial vehicle using a remote operation device that includes a remote communication unit configured to perform wireless communication with a vehicle communication unit included in the industrial vehicle. The industrial vehicle remote operation method is characterized by including: a signal generation step in which the remote operation device repeatedly executes a signal generation process for generating a remote operation signal used for the remote operation of the industrial vehicle; a signal transmission step in which the remote communication unit sequentially transmits the remote operation signal generated by the signal generation step to the vehicle communication unit; a drive control step in which the industrial vehicle operates based on the remote operation signal received by the vehicle communication unit; a delay time calculation step in which the industrial vehicle calculates a delay time corresponding to a difference between a reception period required for the vehicle communication unit to receive a plurality of the remote operation signals and a generation period required for generating the plurality of remote operation signals; a communication delay determination step in which the industrial vehicle performs a communication delay determination for determining whether or not a communication delay has been caused based on the delay time; and a communication delay handling control step in which the industrial vehicle executes communication delay handling control corresponding to the communication delay when it is determined that the communication delay has been caused in the communication delay determination.

According to the respective configurations described above, the remote operation signal generated by the signal generation unit is transmitted from the remote communication unit to the vehicle communication unit, and received by the vehicle communication unit. Thereafter, the industrial vehicle performs a motion based on the remote operation signal.

In this configuration, the communication delay determination is made based on the delay time corresponding to the difference between the reception period and the generation period associated with a plurality of the remote operation signals. When it is determined that a communication delay has been caused based on the communication delay determination, communication delay handling control is performed. In this manner, it is possible to manage the communication delay.

In particular, according to the respective configurations described above, the communication delay determination is performed using the delay time corresponding to the difference between the generation period and the reception period associated with a plurality of the remote operation signals. Accordingly, accuracy in determining whether or not a communication delay has been caused may improve more than in a configuration in which communication delay determination is made using only one remote operation signal.

Moreover, the remote operation signal is adopted as a signal used for the communication delay determination. In this case, the communication delay determination is made based on the delay condition of the remote operation signal which is actually used for the remote operation. Accordingly, the communication delay determination suitable for responsiveness of the industrial vehicle is achievable.

Advantageous Effects of Invention

According to the present invention, a communication delay may be managed.

DESCRIPTION OF EMBODIMENTS

First Embodiment

An industrial vehicle remote operation system and the like according to a first embodiment will be hereinafter described.

Figure 1:
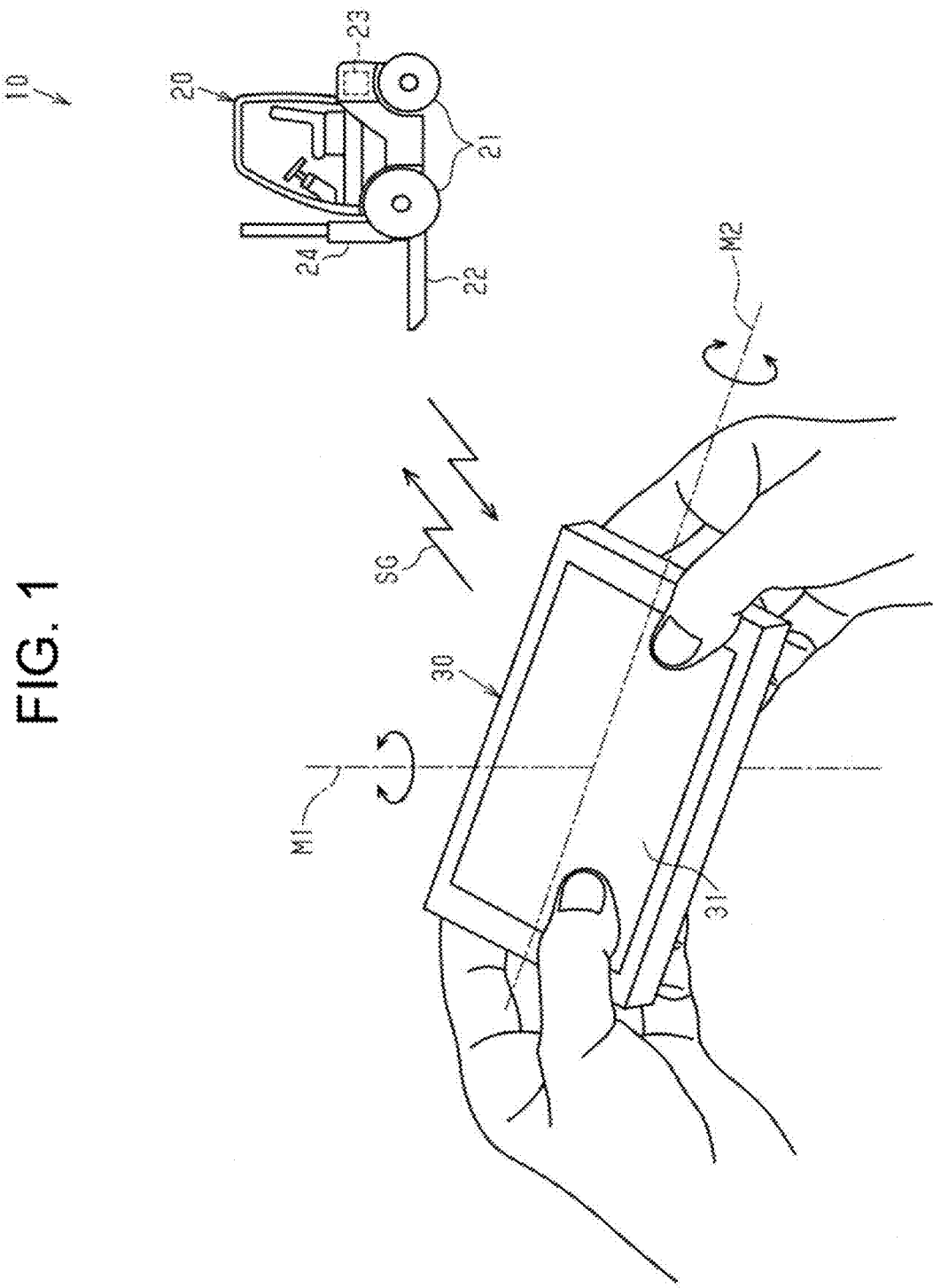
FIG. 1 is a schematic view of an industrial vehicle remote operation system.

As shown in FIG. 1, an industrial vehicle remote operation system 10 includes a forklift truck 20 which is an industrial vehicle, and a remote operation device 30 used for remote operation of the forklift truck 20.

The forklift truck 20 includes wheels 21, and forks 22 as a load-handling device for loading and unloading loads. The forklift truck 20 according to the present embodiment is configured such that a driver is allowed to sit on a seat during driving. The forks 22 are configured to perform a lifting motion, a reaching motion, and a tilting motion, For example, the forklift truck 20 may be of an engine type equipped with an engine, an EV type equipped with a power storage device and an electric motor, or an FCV type equipped with a fuel cell and an electric motor. Alternatively, for example, the forklift truck 20 may be of an HV type that includes an engine, a power storage device, and an electric motor.

Figure 2:
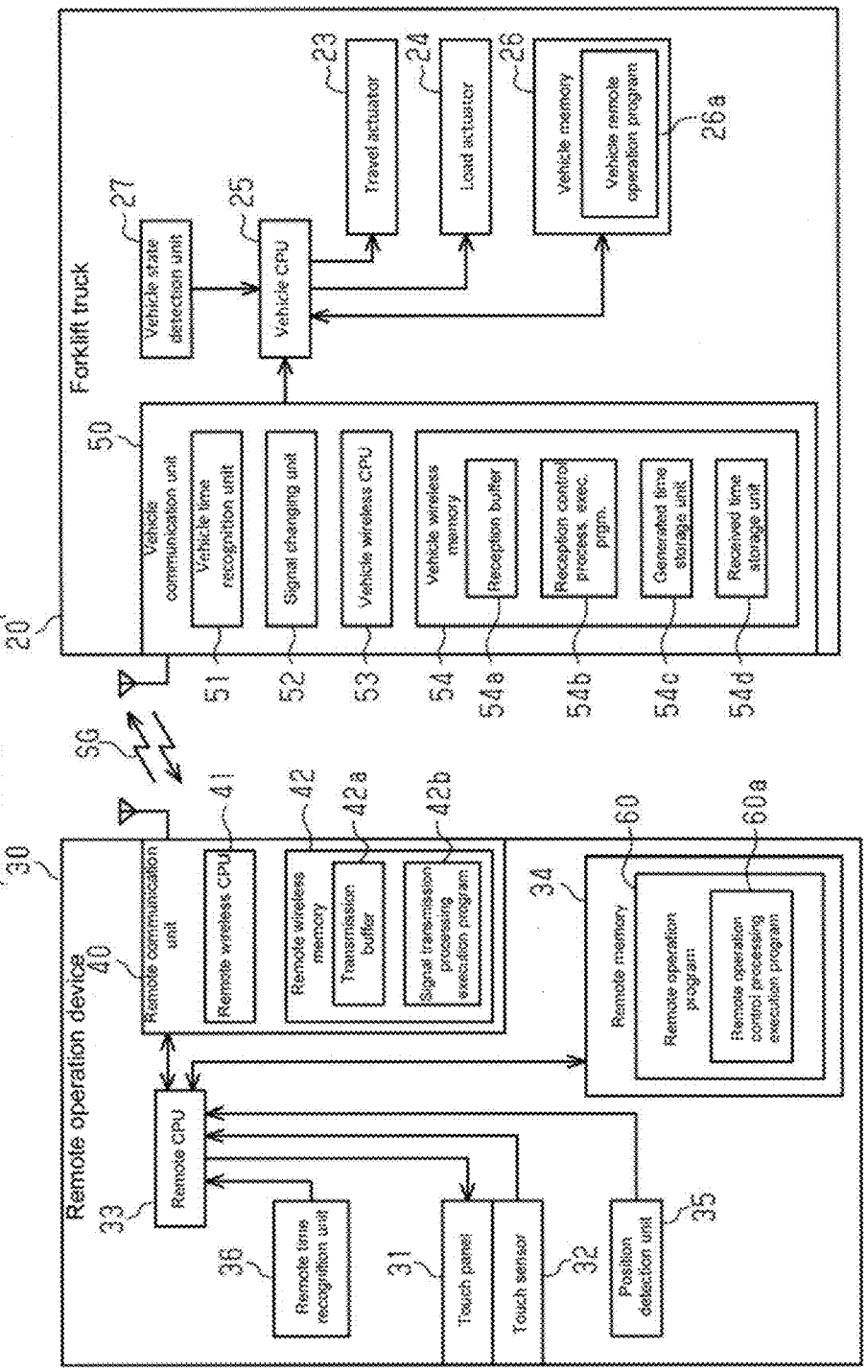
FIG. 2 is a block diagram showing an electrical configuration of the industrial vehicle remote operation system.

As shown in FIG. 2, the forklift truck 20 includes a travel actuator 23, a load actuator 24, a vehicle CPU 25 which controls the travel actuator 23 and the load actuator 24, a vehicle memory 26, and a vehicle state detection unit 27.

The travel actuator 23 is used for traveling of the forklift truck 20, specifically for rotating and driving the wheels 21 and changing a steering angle (traveling direction). The travel actuator 23 is constituted by an engine, a steering device, and the like when the forklift truck 20 is of an engine type, for example. The travel actuator 23 is constituted by an electric motor for rotating and driving the wheels 21, a steering device, and the like when the forklift truck 20 is of an EV type, for example, The load actuator 24 is used for performing a motion different from traveling, specifically for driving the forks 22. For example, the load actuator 24 performs a lifting motion for shifting the forks 22 in an up-down direction, a reaching motion for shifting the forks 22 in a front-rear direction, and a tilting motion for tilting the forks 22.

The vehicle CPU 25 reads out and executes various programs stored in the vehicle memory 26 to control the travel actuator 23 and the load actuator 24 in accordance with an operation of a steering device and various operation levers provided on the forklift truck 20. Accordingly, the forklift truck 20 of the present embodiment is also operable not by using the remote operation device 30, but by using the steering device or the various operation levers provided on the forklift truck 20. The vehicle CPU 25 is also considered as a vehicle ECU and a vehicle MPU.

The vehicle state detection unit 27 is configured to detect a state of the forklift truck 20. For example, the vehicle state detection unit 27 detects a current traveling manner of the forklift truck 20 and a current manner of motion of the forks 22, and also detects the presence or absence of an abnormality of the forklift truck 20, and outputs, to the vehicle CPU 25, a detection signal which includes settings of travel information, motion information, and abnormality information as results of the detection. The vehicle CPU 25 recognizes a current state of the forklift truck 20 based on a detection signal input from the vehicle state detection unit 27.

For example, the travel information includes information associated with a travel speed, an acceleration, and a steering angle of the forklift truck 20. The motion information includes information associated with a position of the forks 22 in the up-down direction (lift position) and a motion speed during the lifting motion, information associated with a position of the forks 22 in the front-rear direction (reach position) and a motion speed during the reaching motion, and information associated with a tilt angle of the forks 22 with respect to the vertical direction and a motion speed during the tilting motion.

Examples of the abnormality of the forklift truck 20 include an abnormality of the travel actuator 23 or the load actuator 24, and an abnormality of the wheels 21. However, the abnormality of the forklift truck 20 is not limited to these examples. When the forklift truck 20 includes a power storage device, for example, the abnormality may include an abnormality of the power storage device and others.

The remote operation device 30 is an operation terminal having a communication function. The remote operation device 30 is a general-purpose product such as a smartphone or a tablet terminal. However, the remote operation device 30 is not limited to these examples, and may be of any types, such as a controller for a game device, a cellular phone, and a virtual reality terminal, or may be a dedicated product for remote operations. As shown in FIG. 1, the remote operation device 30 of the present embodiment has a rectangular plate shape having a longer direction in one direction and a shorter direction in the other direction.

As shown in FIG. 2, the remote operation device 30 includes a touch panel 31, a touch sensor 32, a remote CPU 33, a remote memory 34, a position detection unit 35, and a remote time recognition unit 36.

As shown in FIG. 1, the touch panel 31 is formed on one plate surface of the remote operation device 30. The touch panel 31 has a rectangular shape having a longer direction and a shorter direction. The longer direction of the touch panel 31 is aligned with the longer direction of the remote operation device 30. The touch panel 31 is configured to display a desired image.

When the remote operation device 30 is held lengthways, the shorter direction of the touch panel 31 corresponds to the up-down direction or the front-rear direction as viewed from an operator. In this case, the longer direction of the touch panel 31 corresponds to the left-right direction as viewed from an operator.

In the following description, it is assumed, for convenience of explanation, that the upper end side of the touch panel 31 (upward direction in FIG. 4) as viewed from the operator is defined as the upper side, while the lower end side (downward direction in FIG. 4) as viewed from the operator is defined as the lower side in a state where the remote operation device 30 is horizontally held in a manner allowing visual recognition of the touch panel 31.

The touch sensor 32 detects an input operation (e.g., tap or swipe operation) made to the touch panel 31, as a type of operation performed for the remote operation device 30. Specifically, the touch sensor 32 detects whether or not a finger is in contact with the touch panel 31, and detects a position of the contact when the contact of the finger is detected. Thereafter, the touch sensor 32 outputs a detection result to the remote CPU 33. In this manner, the remote CPU 33 recognizes an input operation to the touch panel 31. A specific configuration of the touch sensor 32 may be any configuration. For example, the touch sensor 32 may be a capacitance sensor achieving detection based on a change in capacitance, a pressure sensor, or other sensors.

The remote CPU 33 executes various processes using various programs stored in the remote memory 34. Specifically, the remote memory 34 stores a program associated with image control of the touch panel 31. The remote CPU 33 performs display control of the touch panel 31 by reading out and executing this program. The remote CPU 33 further recognizes various operations performed for the remote operation device 30 based on signals input from the touch sensor 32 and the position detection unit 35.

The position detection unit 35 detects a position or orientation of the remote operation device 30. The position detection unit 35 includes a three-axis acceleration sensor and a three-axis gyro sensor, for example, and detects a direction and a change of the remote operation device 30 based on information obtained from these sensors, For example, when the opposite ends of the remote operation device 30 in the longer direction are held by the operator as shown in FIG. 1, the position detection unit 35 detects a rotation operation (hereinafter simply referred to as "first rotation operation") having a rotation axis corresponding to a first centerline M1 which passes through the center of the remote operation device 30 and extends in a thickness direction of the remote operation device 30. The position detection unit 35 further detects a rotation operation having a second rotation axis corresponding to a second centerline M2 which passes through the center of the remote operation device 30 and extends in the longer direction of the remote operation device 30 (hereinafter simply referred to as "second rotation operation"). The first centerline M1 (first rotation axis) and the second centerline M2 (second rotation axis) are orthogonal to each other.

A first rotation operation direction is a rotation direction of the remote operation device 30 about a rotation axis extending in the thickness direction of the remote operation device 30, while a second rotation operation direction is a rotation direction of the remote operation device 30 about a rotation center extending in the longer direction of the remote operation device 30. In other words, the position detection unit 35 detects a change in the rotation position of the remote operation device 30 in the first rotation operation direction, and a change in the rotation position of the remote operation device 30 in the second rotation operation direction.

The position detection unit 35 detects whether or not at least either the first rotation operation or the second rotation operation is performed, and detects a manner of the rotation operation and outputs a result of the detection to the remote CPU 33 when at least one of the two rotation operations is performed. In this manner, the remote CPU 33 recognizes the first rotation operation and the second rotation operation each corresponding to a type of operations performed for the remote operation device 30. The manner of the rotation operation includes a rotation angle, a rotation speed, and the like.

The remote time recognition unit 36 recognizes a current time, and is electrically connected to the remote CPU 33. This configuration allows the remote CPU 33 to recognize the current time. Note that the specific configuration of the remote time recognition unit 36 may be any configurations, including a type which counts time independently, or a type which acquires time information from the outside, such as a server.

As shown in FIG. 2, the remote operation device 30 and the forklift truck 20 are configured to perform wireless communication with each other, Specifically, the remote operation device 30 includes a remote communication unit 40 which performs wireless communication, while the forklift truck 20 includes a vehicle communication unit 50 which performs wireless communication with the remote communication unit 40.

Each of the remote communication unit 40 and the vehicle communication unit 50 is a communication interface performing wireless communication, and is realized by at least either one or more dedicated hardware circuits, or one or more processors (control circuits) operating under a computer program (software), for example.

When the forklift truck 20 which has been registered is present within a communication range, the remote communication unit 40 establishes a communication connection with the vehicle communication unit 50 of the corresponding forklift truck 20. As a result, signals become exchangeable between the remote operation device 30 and the forklift truck 20.

According to the present embodiment, the wireless communication format between the remote communication unit 40 and the vehicle communication unit 50 is Wi-Fi (i.e., wireless LAN of the IEEE 802.11 standard). Both the communication units 40 and 50 transmit and receive signals by packet communication.

Note that there are a plurality of standards such as IEEE802.11a and IEEE802.11ac for Wi-FI. The wireless communication format between the remote communication unit 40 and the vehicle communication unit 50 may be any one of the plurality of above standards.

Furthermore, the wireless communication format between the remote communication unit 40 and the vehicle communication unit 50 is not limited to Wi-Fi, and may be any type of communication, such as Bluetooth (registered trademark) and Zigbee (registered trademark). In addition, transmission and reception of signals between both the communication units 40 and 50 is not limited to packet communication, and may be any type of transmission and reception.

The remote communication unit 40 includes a remote wireless CPU 41, a remote wireless memory 42, and a transmission buffer 42a included in the remote wireless memory 42.

The remote CPU 33 and the remote communication unit 40 are electrically connected to each other. The remote CPU 33 repeatedly executes a process which generates a remote operation signal SG used for a remote operation of the forklift truck 20, and outputs the remote operation signal SG to the remote communication unit 40. The remote wireless CPU 41 sets (i.e., saves or stores) the remote operation signal SG for the transmission buffer 42a in response to input of the remote operation signal SG to the remote communication unit 40.

Figure 3:
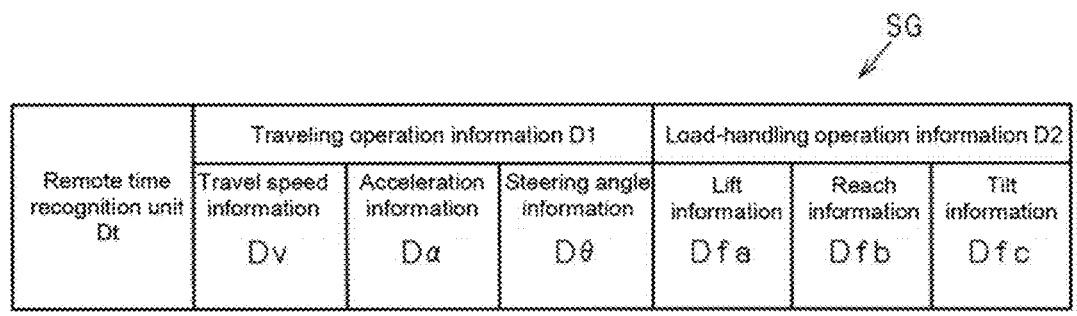
FIG. 3 is a conceptual diagram for explaining a remote operation signal.

The remote communication unit 40 also sequentially transmits the remote operation signals SG generated by the remote CPU 33 to the vehicle communication unit 50. Specifically, the remote wireless CPU 41 of the remote communication unit 40 reads a signal transmission processing execution program 42b stored in the remote wireless memory 42 and executes a signal transmission process to sequentially transmit the remote operation signals SG set for the transmission buffer 42a to the vehicle communication unit 50. The remote operation signal SG is a signal corresponding to a wireless communication standard, and is a packet communication signal corresponding to a Wi-Fi standard according to the present embodiment, As shown in FIG. 3, the remote operation signal SG is a signal including settings of various information associated with remote operations, Specifically, the remote operation signal SG includes remote time information Dt and, as information associated with remote operations, traveling operation information D1 associated with a travel operation, and load-handling operation information D2 associated with a load-handling operation, The remote time information Dt is information indicating a time when the remote operation signal SG is generated by the remote CPU 33. Note that the time set as the remote time information Dt may not agree with the time when the remote operation signal SG is actually transmitted. Details of this point will be described below.

For example, the traveling operation information D1 includes travel speed information Dv which includes a setting of a traveling speed of the forklift truck 20, acceleration information Da which includes a setting of an acceleration of the forklift truck 20, and steering angle information Dθ which includes a setting of a steering angle of the forklift truck 20, For example, the load-handling operation information D2 includes lift information Dfa which includes a setting of a stroke amount of the lifting motion, reach information Dfb which includes a setting of a stroke amount of the reaching motion, and tilt information Dfc which includes a setting of a tilt angle of the tilting motion.

As shown in FIG. 2, the vehicle communication unit 50 of the forklift truck 20 includes a vehicle time recognition unit 51 for recognizing time, a signal converting unit 52, a vehicle wireless CPU 53, a vehicle wireless memory 54, and a reception buffer 54a included in the vehicle wireless memory 54.

The vehicle time recognition unit 51 is provided separately from the remote time recognition unit 36, and is used to recognize a time when the remote operation signal SG is received. Note that the specific configuration of the vehicle time recognition unit 51 may be any configurations, including a type which counts time independently, or a type which acquires time information from the outside, such as a server. In addition, the time of the remote time recognition unit 36 and the time of the vehicle time recognition unit 51 preferably agree with each other, but the times may differ from each other.

The signal converting unit 52 converts the remote operation signal SG into a control signal corresponding to an in-vehicle communication standard. According to the present embodiment, the specific in-vehicle communication standard of the forklift truck 20 is CAN standard. Accordingly, the control signal of the present embodiment is a CAN signal. However, the in-vehicle communication standard is not limited to this example and may be any standards.

The control signal includes settings of the remote time information Dt, the traveling operation information D1, and the load-handling operation information D2. Accordingly, the signal converting unit 52 is a unit which converts the remote operation signal SG corresponding to the wireless communication standard into a control signal corresponding to the in-vehicle communication standard, while maintaining the remote time information Dt and both the operation information D1 and the operation information D2 included in the settings of the remote operation signal SG.

The vehicle wireless memory 54 stores a reception control processing execution program 54b for executing a reception control process corresponding to the remote operation signal SG.

The vehicle wireless CPU 53 reads out the reception control processing execution program 54b, and executes the reception control process to determine whether or not the remote operation signal SG has been received. In addition, the vehicle wireless CPU 53 is configured to convert, by using the signal is converting unit 52, the remote operation signal SG into a control signal recognizable by the vehicle CPU 25, and store the converted control signal in the reception buffer 54a when the remote operation signal SG is received by the vehicle communication unit 50. Details of the reception control process will be described below.

The reception buffer 54a, which is a storage area for storing the control signal converted by the signal converting unit 52, is configured to store one or a plurality of control signals. The control signal stored in the reception buffer 54a is deleted when transmitted to the vehicle CPU 25.

The vehicle CPU 25 is electrically connected to the vehicle communication unit 50 to allow signal exchange between the vehicle CPU 25 and the vehicle communication unit 50. When the control signal is stored in the reception buffer 54a, the vehicle CPU 25 drives the forklift truck 20 (specifically, both the actuators 23 and 24) in a manner corresponding to the control signal. In this manner, the forklift truck 20 performs a motion corresponding to the traveling operation information D1 and the load-handling operation information D2 included in the settings of the remote operation signal SG.

For example, suppose that the remote operation signal SG indicating a numerical value other than "0" as each of the information pieces Dv and Dα included in the traveling operation information D1, and indicating "0" or "null" as each of the information pieces Dfa, Dfb, and Dfc included in the load-handling operation information D2 is transmitted from the remote communication unit 40. In this case, the vehicle CPU 25 controls the travel actuator 23 to achieve acceleration or deceleration at the acceleration included in the acceleration information Dα and such that a traveling speed included in the travel speed information Dv is obtained, and changes the steering angle of the forklift truck 20 to the steering angle included in the steering angle information Dθ.

In addition, when the remote operation signal SG indicating a numerical value other than "0" as the lift information Dfa, and indicating "0" or "null" as other information is transmitted from the remote communication unit 40, for example, the vehicle CPU 25 controls the load actuator 24 such that the forks 22 shift in the up-down direction by a stroke amount of the numerical value included in the lift information Dfa.

For example, the lift information Dfa is numerical information which possibly indicates either a positive (+) value or a negative (−) value. When the lift information Dfa indicates a positive value, the vehicle CPU 25 controls the load actuator 24 (specifically, the lift drive unit 24a) so that the forks 22 shift upward by the stroke amount represented by the numerical value included in the lift information Dfa. On the other hand, when the lift information Dfa indicates a negative value, the vehicle CPU 25 controls the load actuator 24 (specifically, the lift drive unit 24a) so that the forks 22 shift downward by the stroke amount represented by the numerical value included in the lift information Dfa. The same is applicable to the reach information Dfb and the tilt information Dfc.

As described above, a remote operation of the forklift truck 20 is performed based on the remote operation signal SG transmitted and received between both the communication units 40 and 50 when the remote operation device 30 and the forklift truck 20 (specifically, both communication units 40 and 50) are disposed within a communicable range.

Accordingly, the industrial vehicle remote operation system 10 is a system which includes the vehicle communication unit 50 configured to receive the remote operation signal SG, and remotely operates the forklift truck 20, which operates based on the remote operation signal SG, using the remote operation device 30. For remotely operating the forklift truck 20, the remote operation device 30 includes the remote CPU 33 which executes a process for repeatedly generating the remote operation signal SG, and the remote communication unit 40 which sequentially transmits the generated remote operation signals SG.

The following will describe a detailed configuration associated with remote operation control of the forklift truck 20 using the remote operation device 30.

As shown in FIG. 2, the remote memory 34 stores a remote operation program 60 for executing various processes associated with remote operations of the forklift truck 20. The remote operation program 60 is an application program for performing remote operations of the forklift truck 20 using the remote operation device 30.

The remote operation program 60 includes a remote operation control execution program 60a used for executing a remote operation control process for performing a remote operation corresponding to an operation for the remote operation device 30. The remote operation control process includes a process for generating the remote operation signals SG, and a setting process for the transmission buffer 42a.

When a remote operation activation condition is met, the remote CPU 33 activates the remote operation program 60 (remote operation application).

According to the present embodiment, the remote operation activation condition is that an activation operation is performed for the remote operation device 30. For example, the activation operation is an input operation made to any of remote operation icons in a configuration which displays the remote operation icons on the touch panel 31.

However, the remote operation activation condition is not limited to this condition and may be any conditions. For example, the remote operation activation condition may be a condition that communication connection between the remote communication unit 40 of the remote operation device 30 and the vehicle communication unit 50 of the forklift truck 20 is established, or that an activation operation is performed under a situation where communication connection between both the communication units 40 and 50 is established. Note that an operation by the operator is not necessarily required for the remote operation activation condition.

With the activation of the remote operation program 60, the remote CPU 33 initially searches for the forklift truck 20 configured to establish a communication connection within a range communicable with the remote communication unit 40, and establishes a communication connection with the vehicle communication unit 50 of the corresponding forklift truck 20 when the forklift truck 20 is found.

Thereafter, the remote CPU 33 displays an operation image G10 on the touch panel 31, The operation image G10 is stored in the remote operation program 60.

Figure 4:
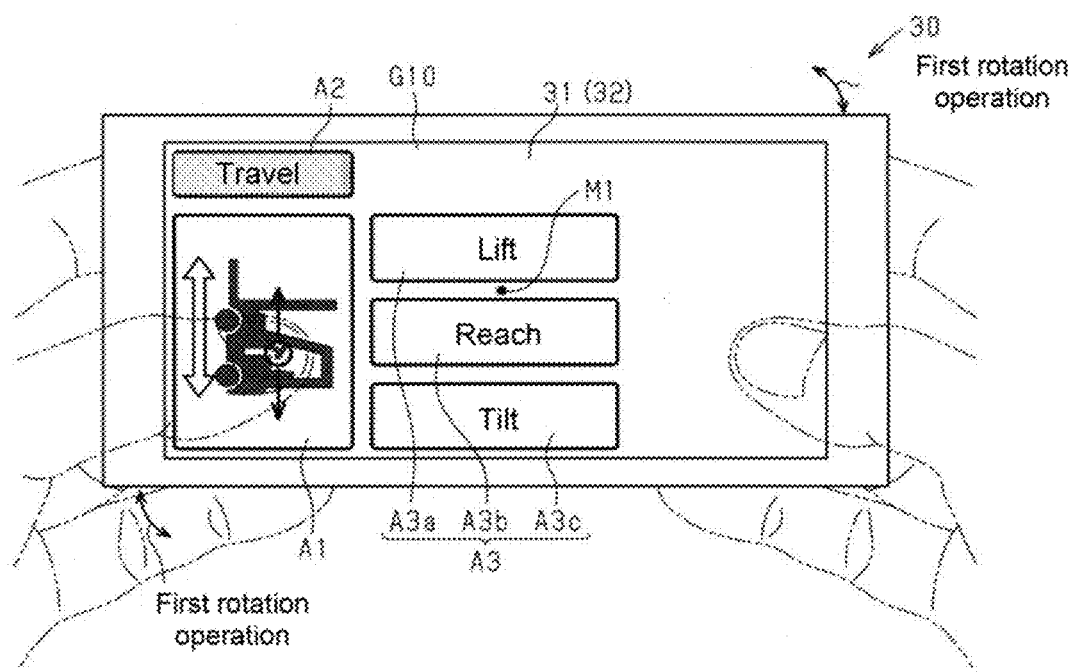
FIG. 4 is a front view of a remote operation device on which an operation image is displayed.

As shown in FIG. 4, the operation image G10 is displayed on an entire surface of the touch panel 31. The operation image G10 has a shape having a longer direction and a shorter direction (specifically, a rectangular shape) in correspondence with the touch panel 31 which has a shape having a longer direction and a shorter direction (specifically, a rectangular shape).

An operation area A1, and a traveling icon A2 and a load-handling icon A3 provided at positions different from the operation area A1 are displayed in the operation image G10.

The operation area A1 is disposed near one of both ends of the operation image G10 in the longer direction. The operation area A1 is provided at a position where a finger (e.g., thumb) of the left hand is automatically located when the remote operation device 30 is held with both hands. An image of the forklift truck 20 is displayed within the operation area A1.

The traveling icon A2 is provided within the operation image G10 at a position apart from the operation area A1 in the shorter direction of the touch panel 31. In other words, the traveling icon A2 and the operation area A1 are disposed in the shorter direction.

The load-handling icon A3 is disposed at the center portion of the operation image G10. The load-handling icon A3 includes a lift icon A3a, a reach icon A3b, and a tilt icon A3c. The respective icons A3a to A3c are arranged apart from each other in the shorter direction of the touch panel 31. Note that the shapes and the positional relationship of the operation area A1 and the respective icons A2 and A3a to A3c are not limited to those described herein and may be any shapes, and positional relationships.

According to the present embodiment, the remote CPU 33 generates the remote operation signals SG such that an action corresponding to an icon selected from the icons A2 and A3a to A3c in accordance with an input operation (e.g., tapping) is achieved in a manner corresponding to a manner of operation performed for the operation area A1. For example, when the traveling icon A2 is selected, the remote CPU 33 generates the remote operation signals SG such that traveling is achieved at a travel speed and an acceleration corresponding to an operation mode performed for the operation area A1.

According to the present embodiment, the icon selected in the operation image G10 is highlighted. For example, when the traveling icon A2 is selected, the traveling icon A2 is more highlighted than the load-handling icon A3 as shown in FIG. 4. Note that the image within the operation area. A1 may be different for each action (traveling, lifting motion, reaching motion, and tilting motion).

After displaying the operation image G10 on the touch panel 31, the remote CPU 33 reads out the remote operation control execution program 60a, and repeatedly executes the remote operation control process to repeatedly generate the remote operation signals SG corresponding to an operation performed by the operator for the remote operation device 30.

The remote operation control process will be hereinafter described with reference to FIG. 5.

Figure 5:
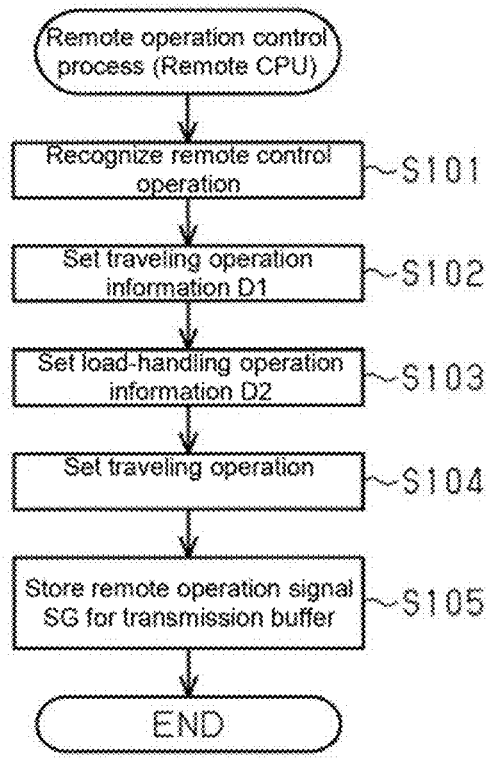
FIG. 5 is a flowchart of a remote operation control process.

As shown in FIG. 5, the remote CPU 33 in step S101 initially recognizes a remote control operation performed for the remote operation device 30 based on a detection result obtained by the touch sensor 32 and a detection result obtained by the position detection unit 35. According to the present embodiment, the remote control operation performed for the remote operation device 30 is an input operation to the touch panel 31 and the first rotation operation.

For example, the remote CPU 33 recognizes whether or not a swipe operation has been performed as a trigger of an input operation to the inside of the operation area A1 as a type of an input operation to the operation area A1 based on the detection result obtained by the touch sensor 32. The swipe operation is constituted by a series of input operations in which position of an input operation is moved while maintaining the state that the input operation is made to the touch panel 31. In other words, the swipe operation is also considered as an input operation made to the touch panel 31, where the position of the input operation successively changes.

Specifically, the remote CPU 33 determines that the swipe operation is performed when an input operation initially made to the inside of the operation area A1 continues even after the operation in a state where the input operation position is continuous, and recognizes relative positions of a start position which is the position where the input operation is initially made and a position where the current input operation is made.

The remote CPU 33 further recognizes whether or not the first rotation operation has been made based on the detection result obtained by the position detection unit 35, and a rotation angle of the first rotation operation when the first rotation operation is determined to have been made.

In the subsequent step S102, the remote CPU 33 sets the traveling operation information D1 based on a recognition result in step S101. For example, when the traveling icon A2 is selected from the respective icons A2 and A3a to A3c, the remote CPU 33 sets the travel speed information Dv and the acceleration information Dα based on the operation mode of the swipe operation performed for the operation area A1, and sets the steering angle information Dθ based on the operation mode of the first rotation operation.

Note that the specific manner of setting of the traveling operation information D1 may be any manners. For example, the remote CPU 33 may determine a forward or backward movement based on the swipe direction of the swipe operation triggered by an input operation to the operation area A1, and may vary the travel speed and the acceleration in response to a stroke amount of the swipe operation. More specifically, the remote CPU 33 may set the travel speed information Dv and the acceleration information Dα such that the travel speed and the acceleration vary in response to the distance between the start position of the swipe operation and the current position in the shorter direction of the touch panel 31. Moreover, the remote CPU 33 may set the steering angle information Dθ such that a steering angle increases with an increase in an operation angle of the first rotation operation.

Furthermore, when any icon other than the traveling icon A2 is selected from the respective icons A2 and A3a to A3c, for example, the remote CPU 33 sets the traveling operation information D1 corresponding to a travel stop. The traveling operation information D1 corresponding to the travel stop is the traveling operation information D1 which includes a setting of "0" for all of the travel speed information Dv, the acceleration information Dα, and the steering angle information Dθ, for example.

Thereafter, in step S103, the remote CPU 33 sets the load-handling operation information D2 based on the recognition result in step S101.

For example, when any one of the respective icons A3a to A3c is selected, the remote CPU 33 sets the load-handling operation information D2 corresponding to the selected icon. When the lift icon A3a is selected, for example, the remote CPU 33 sets the lift information Dfa such that the direction and the stroke amount of the lifting motion vary in response to the swipe direction and the swiping amount of the swipe operation triggered by an operation manner of an input operation to the touch panel 31, such as an input operation to the operation area A1. Thereafter, the remote CPU 33 sets "0" as the reach information Dfb and the tilt information Dfc such that the reaching motion and the tilting motion are not performed.

Note that the reach information Dfb includes a setting of a numerical value corresponding to the operation manner of the input operation to the touch panel 31 when the reach icon A3b is selected. The other information includes a setting of "0", In addition, when the tilt icon A3c is selected, the tilt information Dfc includes a setting of a numerical value corresponding to the operation manner of the input operation to the touch panel 31. The other information includes a setting of "0".

Furthermore, when the traveling icon A2 is selected from the respective icons A2 and A3a to A3c, the remote CPU 33 sets the load-handling operation information D2 corresponding to a load-handling stop. The load-handling operation information D2 corresponding to the load-handling stop is the load-handling operation information D2 which includes a setting of "0" for all of the lift information Dfa, the reach information Dfb, and the tilt information Dfc, for example.

In the subsequent step S104, the remote CPU 33 recognizes the current time based on a recognition result obtained by the remote time recognition unit 36, and sets the current time as the remote time information Dt.

As described above, the remote operation signal SG which includes settings of the remote time information Dt, the traveling operation information D1, and the load-handling operation information D2 is generated by performing the processing of steps S101 to S104. In this case, the remote time information Dt includes a setting of a generated time to which is a time when the remote operation signals SG are generated. The processing in steps S101 to S104 is considered as processing for generating the remote operation signals SG.

According to the present embodiment, the processing of steps S101 to S104 corresponds to a "signal generation process" and a "signal generation step", while the remote CPU 33 which executes this processing corresponds to a "signal generation unit".

Thereafter, in step S105, the remote CPU 33 executes a process of setting (in other words, saving or storing) the generated remote operation signals SG for the transmission buffer 42a (see FIG. 2) included in the remote communication unit 40, and ends this remote operation control process. Specifically, the remote CPU 33 outputs the generated remote operation signals SG to the remote communication unit 40. The remote wireless CPU 41 of the remote communication unit 40 having received the remote operation signals SG output from the remote CPU 33 sets the remote operation signals SG for the transmission buffer 42a.

Note that the remote operation control process is executed in a prescribed cycle according to the present embodiment. Accordingly, the remote operation signals SG are periodically generated in the prescribed cycle and set for the transmission buffer 42a. In other words, according to the present embodiment, a generation interval δTa of the remote operation signals SG is fixed (prescribed cycle).

The transmission buffer 42a herein is configured to store a plurality of the remote operation signals SG. Specifically, the transmission buffer 42a has a plurality of storage areas in each of which the remote operation signals SG are stored. Accordingly, in a state where the remote operation signal SG is not transmittable, a plurality of the remote operation signals SG may be sequentially set for the transmission buffer 42a, and wait for transmission.

The remote wireless CPU 41 of the remote communication unit 40 sequentially transmits the remote operation signals SG set for the transmission buffer 42a by executing the signal transmission process during execution of a remote operation. According to the present embodiment, the signal transmission process corresponds to a "signal transmission step".

The signal transmission process will be described with reference to FIG. 6.

Figure 6:
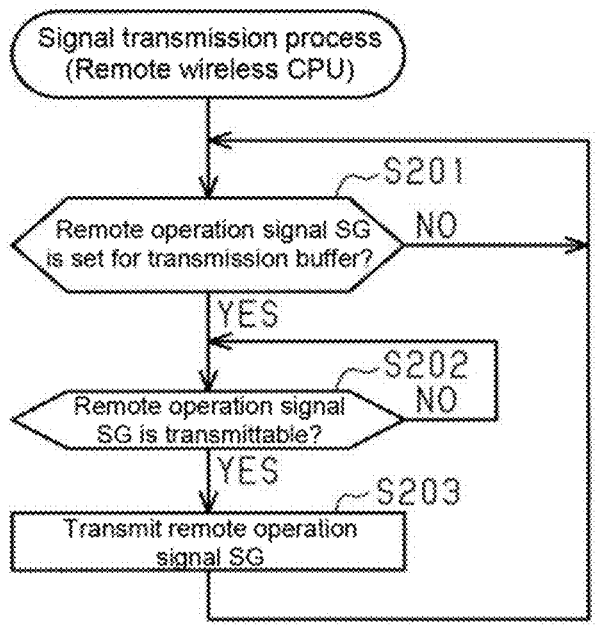
FIG. 6 is a flowchart of a signal transmission process.

As shown in FIG. 6, the remote wireless CPU 41 in step S201 initially determines whether or not the remote operation signal SG has been set for the transmission buffer 42a, When it is determined that the remote operation signal SG has not been set for the transmission buffer 42a, the remote wireless CPU 41 waits until the remote operation signal SG is set, The remote wireless CPU 41 makes an affirmative determination in step S201 based on a state that the remote operation signal SG has been set for the transmission buffer 42a, and advances the process to step S202. In step S202, the remote wireless CPU 41 determines whether or not the current state is a transmittable state where the remote operation signal SG is transmittable.

The following will describe the transmittable state in detail. Wireless communication between the remote communication unit 40 and the vehicle communication unit 50 is also performed for wireless communication between other devices in some cases. For example, when Wi-Fi is adopted for wireless communication between the remote communication unit 40 and the vehicle communication unit 50, the Wi-Fi may also be used for wireless communication between other devices. In this case, signals are exchanged among a plurality of devices using the same communication channel. As a result, the communication environment may come into a so-called crowded state where a signal transmission waiting state is caused.

Note that the wireless communication between other devices includes wireless communication between devices other than both the communication units 40 and 50, wireless communication between the remote communication unit 40 and devices other than the vehicle communication unit 50, and wireless communication between the vehicle communication unit 50 and devices other than the remote communication unit 40. Moreover, in a configuration where the one remote operation device 30 (remote communication unit 40) performs wireless communication with a plurality of the forklift trucks 20 (a plurality of the vehicle communication units 50), the wireless communication between other devices includes wireless communication between the remote communication unit 40 and the vehicle communication unit 50 different from the vehicle communication unit 50 which is the transmission target of the current remote operation signal SG.

In this configuration, a communicable state refers to a state where transmission of the remote operation signal SG is not blocked by transmission or reception of other signals, and where the remote operation signal SG is allowed to be transmitted immediately. In other words, the communicable state is also considered as a state where a communication channel used for wireless communication between both the communication units 40 and 50 is available.

When it is determined that the current state is not the transmittable state, the remote wireless CPU 41 in step S202 waits until the current state shifts to the transmittable state. Thereafter, the remote wireless CPU 41 transmits the remote operation signal SG to the vehicle communication unit 50 in step S203 based on the shift to the transmittable state.

Note that the remote wireless CPU 41 transmits the old signal in the plurality of remote operation signals SG, more specifically, the signal including the oldest remote time information Cat in the remote operation signals SG when a plurality of the remote operation signals SG are set for the transmission buffer 42a Thereafter, the remote wireless CPU 41 deletes the transmitted remote operation signal SG from the transmission buffer 42a.

Accordingly, when the remote operation signal SG is difficult to transmit by other communication, the remote wireless CPU 41 waits until a shift to the transmittable state, and transmits the remote operation signal SG in response to a shift to the transmittable state.

The remote operation signals SG herein is sequentially set for the transmission buffer 42a even in a state of waiting for transmission of the remote operation signals SG (hereinafter also simply referred to as "transmission waiting state"). Accordingly, when a transmission waiting state is caused, a plurality of the remote operation signals SG is set for the transmission buffer 42a, When a plurality of the remote operation signals SG is set for the transmission buffer 42a, the remote wireless CPU 41 sequentially transmits the remote operation signals SG in the order from the oldest signal. In this manner, transmission of the remote operation signals SG suitable for the communication environment is achievable.

According to this configuration, the transmission interval of the remote operation signal SG becomes longer or shorter than the generation interval δTa of the remote operation signal SG. For example, in a communication waiting state, the transmission interval of the remote operation signal SG increases. In addition, when the communication waiting state shifts to the transmittable state in a condition where a plurality of the remote operation signals SG is set for the transmission buffer 42a in the communication waiting state, the remote operation signals SG are sequentially transmitted at a transmission interval shorter than the generation interval δTa. In this case, the transmission interval of the remote operation signal SG is shorter than the generation interval δTa.

Note that the upper limit of the communication range between the remote communication unit 40 and the vehicle communication unit 50, in other words, the Wi-Fi communication range, is several tens meters to several hundreds of meters in the present embodiment. Accordingly, the time required for propagation is relatively short, wherefore the difference between the transmission interval of the remote operation signal SG and the reception interval of the remote operation signal SG is relatively small. According to the present embodiment, it is assumed that these intervals are equal to each other.

The vehicle wireless CPU 53 of the vehicle communication unit 50 repeatedly executes a reception control process for handling the remote operation signal SG transmitted from the remote communication unit 40 when the communication connection with the remote communication unit 40 is established. This reception control process will be described with reference to FIG. 7.

Figure 7:
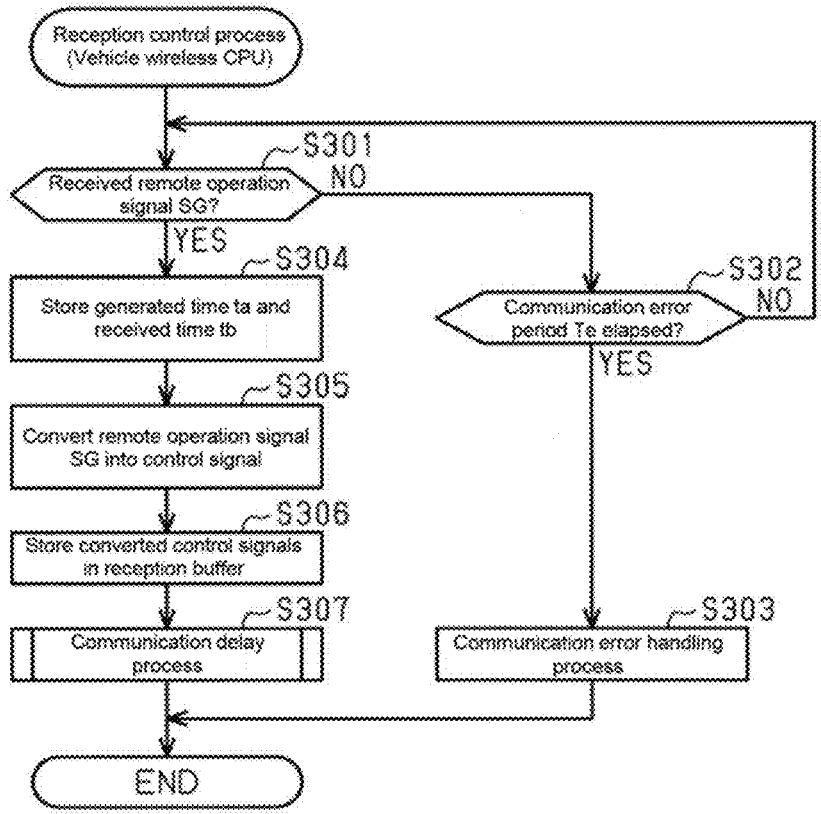
FIG. 7 is a flowchart of a reception control process.

As shown in FIG. 7, in step S301, the vehicle wireless CPU 53 initially determines whether or not the remote operation signal SG has been received.

When it is determined that the remote communication unit 40 has received the remote operation signal SG, the vehicle wireless CPU 53 advances the process to step S304. When it is determined that the remote operation signal SG has not been received, the vehicle wireless CPU 53 advances the process to step S302, and determines whether or not a communication error period Te has elapsed since previous reception of the remote operation signal SG. The communication error period Te may be any periods as long as the communication error period Te is sufficiently longer than the generation interval δTa of the remote operation signal SG.

When it is determined that the vehicle communication unit 50 has never received the remote operation signal SG from establishment of the communication connection at the start of the remote operation, the vehicle wireless CPU 53 determines whether or not the communication error period Te has elapsed since establishment of the communication connection.

When it is determined that the communication error period Te has not elapsed since previous reception of the remote operation signal SG (or establishment of the communication connection), the vehicle wireless CPU 53 returns the process to step S301. In other words, the vehicle wireless CPU 53 waits for reception of the remote operation signal SG until an elapse of the communication error period Te from previous reception of the remote operation signal SG (or establishment of the communication connection).

When it is determined that the communication error period Te has elapsed, the vehicle wireless CPU 53 executes a communication error handling process in step S303 and ends this reception control process based on determination that a communication error has been caused.

The details of the communication error handling process may be any details. For example, the vehicle wireless CPU 53 outputs a communication error occurrence signal to the vehicle CPU 25, and the vehicle CPU 25 stops motion of the forklift truck 20 in response to input of this communication error occurrence signal. In addition, the vehicle wireless CPU 53 waits for re-establishment of the communication connection with the remote communication unit 40 without execution of the reception control process.

Note that the motion of the forklift truck 20 may be any motions as targets of remote operations, including traveling and motions of the forks 22, for example.

As shown in FIG. 7, the vehicle wireless CPU 53 executes processing of steps S304 to S307 in response to reception of the remote operation signal SG.

Initially, in step S304, the vehicle wireless CPU 53 stores the generated time ta and the received time tb of the remote operation signal SG currently received. The generated time ta is a time of the settings of the remote time information Dt included in the remote operation signal SG.

Specifically, the vehicle wireless memory 54 includes a generated time storage unit 54c which stores the generated time ta, and a received time storage unit 54d which stores the received time tb (see FIG. 2).

The generated time storage unit 54c is configured to store two or more times as the generated time ta, and stores at least the generated time ta of the remote operation signal SG previously received, and the generated time ta of the remote operation signal SG currently received.

The received time storage unit 54d is configured to store two or more times as the received time tb, and stores at least the received time tb of the remote operation signal SG previously received, and the received time tb of the remote operation signal SG currently received.

In step S304, the vehicle wireless CPU 53 recognizes the generated time ta of the remote operation signal SG currently received based on the remote time information Dt included in the remote operation signal SG currently received, and updates storage information stored in the generated time storage unit 54c to store the generated time ta currently received and the generated time ta of the remote operation signal SG previously received.

The vehicle wireless CPU 53 further recognizes the received time tb of the remote operation signal SG currently received based on a recognition result obtained by the vehicle time recognition unit 51, and updates storage information stored in the received time storage unit 54d to store the received time tb currently received and the received time tb of the remote operation signal SG previously received.

In the subsequent step 3305, the vehicle wireless CPU 53 converts the remote operation signal SG into a control signal using the signal converting unit 52.

Subsequently, in step 3306, the vehicle wireless CPU 53 stores the converted control signals in the reception buffer 54a.

Thereafter, in step S307, the vehicle wireless CPU 53 executes a communication delay process including a communication delay determination for determining whether or not a communication delay has been caused, and ends this reception control process.

The communication delay process will be described with reference to FIG. 8. Note that the communication delay process is actually executed when the vehicle communication unit 50 receives the remote operation signal SG twice or more after the start of the remote operation (i.e., after establishment of the communication connection). In other words, the vehicle wireless CPU 53 is configured not to execute the communication delay process when the vehicle communication unit 50 receives the remote operation signal SG only once after the start of the remote operation.

Figure 8:
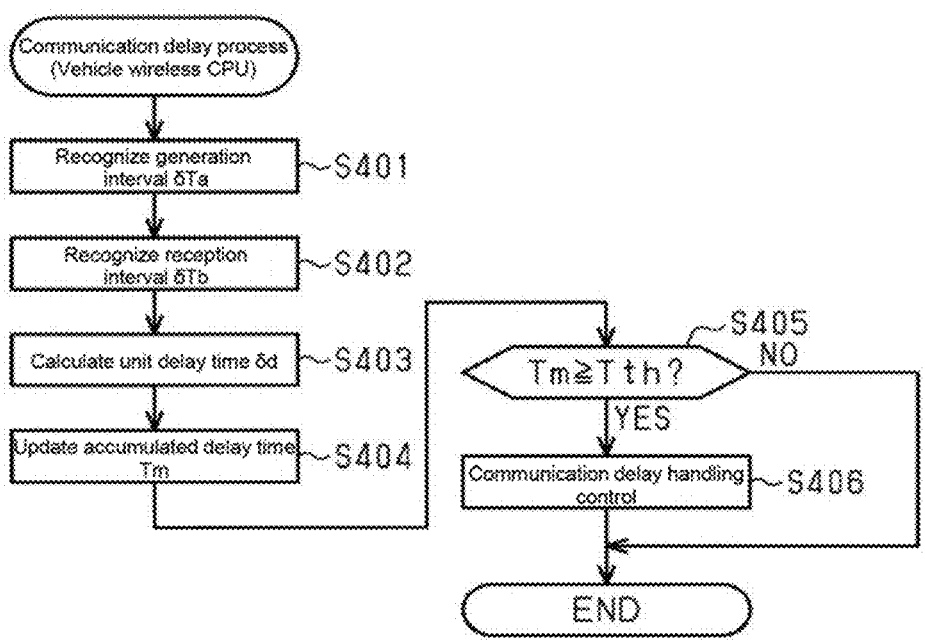
FIG. 8 is a flowchart of a communication delay process according to a first embodiment.

As shown in FIG. 8, the vehicle wireless CPU 53 in step S401 recognizes the generation interval δTa which is a difference between the two generated times ta stored in the generated time storage unit 54c, more specifically, the generated time ta of the remote time information Dt included in the remote operation signal SG previously received, and the generated time ta of the remote time information Dt included in the remote operation signal SG currently received.

In the subsequent step S402, the vehicle wireless CPU 53 recognizes the reception interval δTb which is a difference between the two received times tb stored in the received time storage unit 54d, more specifically, the received time tb of the remote operation signal SG previously received, and the received time tb of the remote operation signal SG currently received.

Thereafter, in step S403, the vehicle wireless CPU 53 calculates a unit delay time δd associated with one remote operation signal SG based on the generation interval δTa and the reception interval δTb. Specifically, the vehicle wireless CPU 53 calculates the unit delay time δd by subtracting the generation interval δTa from the reception interval δTb. The unit delay time δd is a delay time generated in transmission or reception of one remote operation signal SG (i.e., one transmission or reception).

As already described, the transmission interval of the remote operation signal SG, in other words, the reception interval δTb of the remote operation signal SG herein may be longer or shorter than the generation interval δTa. Accordingly, the unit delay time δd may be a positive value or a negative value. Specifically, the unit delay time δd is a positive value when the reception interval δTb of the remote operation signal SG is longer than the generation interval δTa.

On the other hand, the unit delay time δd is a negative value when the reception interval δTb of the remote operation signal SG is shorter than the generation interval δTa In the subsequent step S404, the vehicle wireless CPU 53 updates the accumulated delay time Tm using the unit delay time δd calculated in step S403.

The accumulated delay time Tm is a parameter used for determining whether or not a communication delay has been caused, and is a parameter for recognizing a communication delay status associated with transmission of a plurality of the remote operation signals SG. The accumulated delay time Tm is set to an initial value (e.g., "0") at a start of a remote operation (i.e., at establishment of communication connection), for example, and is sequentially updated corresponding to the communication delay status.

In step S404, the vehicle wireless CPU 53 updates the accumulated delay time Tm by adding or subtracting the unit delay time δd to and from the current accumulated delay time Tm, for example. In this case, an absolute value of the unit delay time δd is added to the accumulated delay time Tm to increase the accumulated delay time Tm by this absolute value when the unit delay time δd is a positive value. On the other hand, an absolute value of the unit delay time δd is subtracted from the accumulated delay time Tm to decrease the accumulated delay time Tm by this absolute value when the unit delay time δd is a negative value.

Note that the accumulated delay time Tm is a real number equal to or larger than "0", and does not become smaller than "0". For example, the vehicle wireless CPU 53 sets the accumulated delay time Tm to "0" when the accumulated delay time Tm becomes a negative value as a result of subtraction of the absolute value of the unit delay time δd from the accumulated delay time Tm in a case where the unit delay time δd is a negative value.

Thereafter, in step S405, the vehicle wireless CPU 53 determines whether or not the updated accumulated delay time Tm is equal to or longer than a delay time threshold Tth. The delay time threshold Tth is set longer than the generation interval δTa of the remote operation signal SG, and shorter than the communication error period Te, for example. The determination process in step S405 corresponds to communication delay determination.

When the accumulated delay time Tm is shorter than the delay time threshold Tth, the vehicle wireless CPU 53 determines that no communication delay has been caused, and ends the communication delay process without change. On the other hand, when the accumulated delay time Tm is equal to or longer than the delay time threshold Tth, the vehicle wireless CPU 53 determines that a communication delay has been caused. In this case, the vehicle wireless CPU 53 executes communication delay handling control in step S406 and ends this communication delay process.

The communication delay handling control may have any specific configurations, including such control which issues a notification that a communication delay has been caused in the remote operation device 30, for example. For example, the vehicle wireless CPU 53 transmits a warning notification signal to the remote communication unit 40 as a type of the communication delay handling control. The remote CPU 33 issues, to an operator, a warning notification that a communication delay has been caused in response to reception of the warning notification signal by the remote communication unit 40. Note that example modes of the warning notification include warning display in the operation image G10 indicating that a communication delay has been caused.

In addition, the communication delay handling control may include remote operation stop control which stops a remote operation, for example. Specifically, the vehicle wireless CPU 53 prohibits execution of the reception control process until reception of a restarting completion notification. The vehicle wireless CPU 53 further transmits a remote operation stop signal to the remote communication unit 40.

The remote CPU 33 stops the remote operation in response to reception of the remote operation stop signal by the remote communication unit 40. Specifically, the remote CPU 33 stops execution of the remote operation control process. As a result, generation of the remote operation signal SG based on the remote control operation for the remote operation device 30 stops, wherefore the remote operation stops.

Moreover, the remote CPU 33 notifies the operator that the remote operation has been stopped based on the communication delay. Note that examples of manner of the stop notification include display, in the operation image G10, showing a state where the remote operation has been stopped based on the communication delay.

Thereafter, the remote CPU 33 restarts the remote operation application, and transmits a restarting completion notification to the vehicle communication unit 50 using the remote communication unit 40 in response to completion of the reactivation.

When attention is paid to the fact that the generation interval δTa and the reception interval δTb used for calculating the unit delay time δd are calculated based on the generated time ta and the received time tb of the remote time information Dt, respectively, the unit delay time δd and the accumulated delay time Tm are also considered to be calculated based on the generated time ta and the received time tb of the remote time information Dt.

The processing from step S401 to step S404 corresponds to a "delay time calculation step", and the vehicle wireless CPU 53 which executes this processing corresponds to a "delay time calculation unit". The processing of step S405 corresponds to a "communication delay determination step", and the is vehicle wireless CPU 53 executing this processing corresponds to a "communication delay determination unit". The processing of step S406 corresponds to a "communication delay handling control step", while the vehicle wireless CPU 53 executing this processing corresponds to a "communication delay handling control unit".

In addition, according to the present embodiment, the reception control processing execution program 54b, particularly the communication delay processing execution program included in the reception control processing execution program 54b corresponds to an "industrial vehicle remote operation program used for the industrial vehicle remote operation system", The vehicle CPU 25 reads a remote operation drive control program 26a (see FIG. 2) included in the vehicle memory 26, and executes the remote operation drive control program 26a during execution of the remote operation to perform driving control of the respective actuators 23 and 24 in a manner corresponding to the remote operation signal SG.

Specifically, the vehicle CPU 25 determines whether or not a control signal has been stored in the reception buffer 54a. For example, the vehicle CPU 25 outputs a request signal requesting a control signal to the vehicle communication unit 50. When the request signal is input, the remote communication unit 40 determines whether or not the control signal has been stored in the reception buffer 54a. When it is determined that the control signal has been stored, the remote communication unit 40 outputs this control signal to the vehicle CPU 25.

When a plurality of control signals is stored in the reception buffer 54a, the remote communication unit 40 outputs the oldest control signal, more specifically, the control signal which includes a setting of the oldest time as the remote time information Dt.

In addition, when the remote communication unit 40 outputs a control signal in response to a request from the vehicle CPU 25, the remote communication unit 40 deletes the control signal output from the reception buffer 54a.

When a control signal is stored in the reception buffer 54a, the vehicle CPU 25 drives the actuators 23 and 24 based on the operation information D1 and D2 included in this control signal.

The vehicle CPU 25 repeatedly executes a series of control described above from determination of whether or not a control signal has been stored in the reception buffer 54a to drive control of the respective actuators 23 and 24. In this manner, drive control of the actuators 23 and 24 corresponding to a control signal (i.e., remote operation signal SG) is performed each time this control signal is stored in the reception buffer 54a.

Note that the step in which the vehicle CPU 25 executes the remote operation drive control program 26a corresponds to a "drive control step", In addition, the vehicle CPU 25 which executes the remote operation drive control program 26a is also considered as a drive control unit which causes an action of the forklift truck 20 based on the remote operation signal SG.

Figure 9:
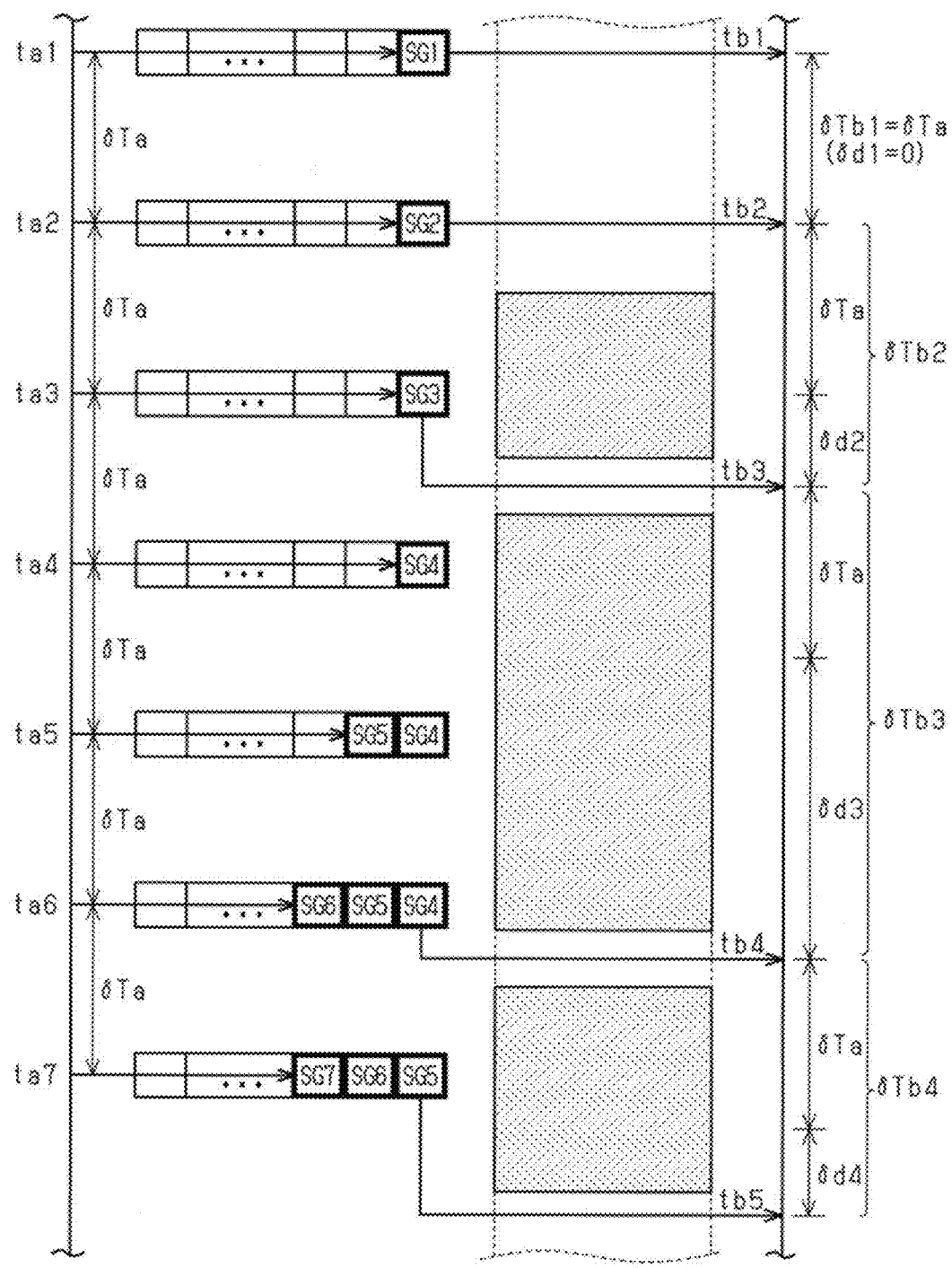
FIG. 9 is a time chart schematically showing a transmission/reception status of a remote operation signal.
Figure 10:
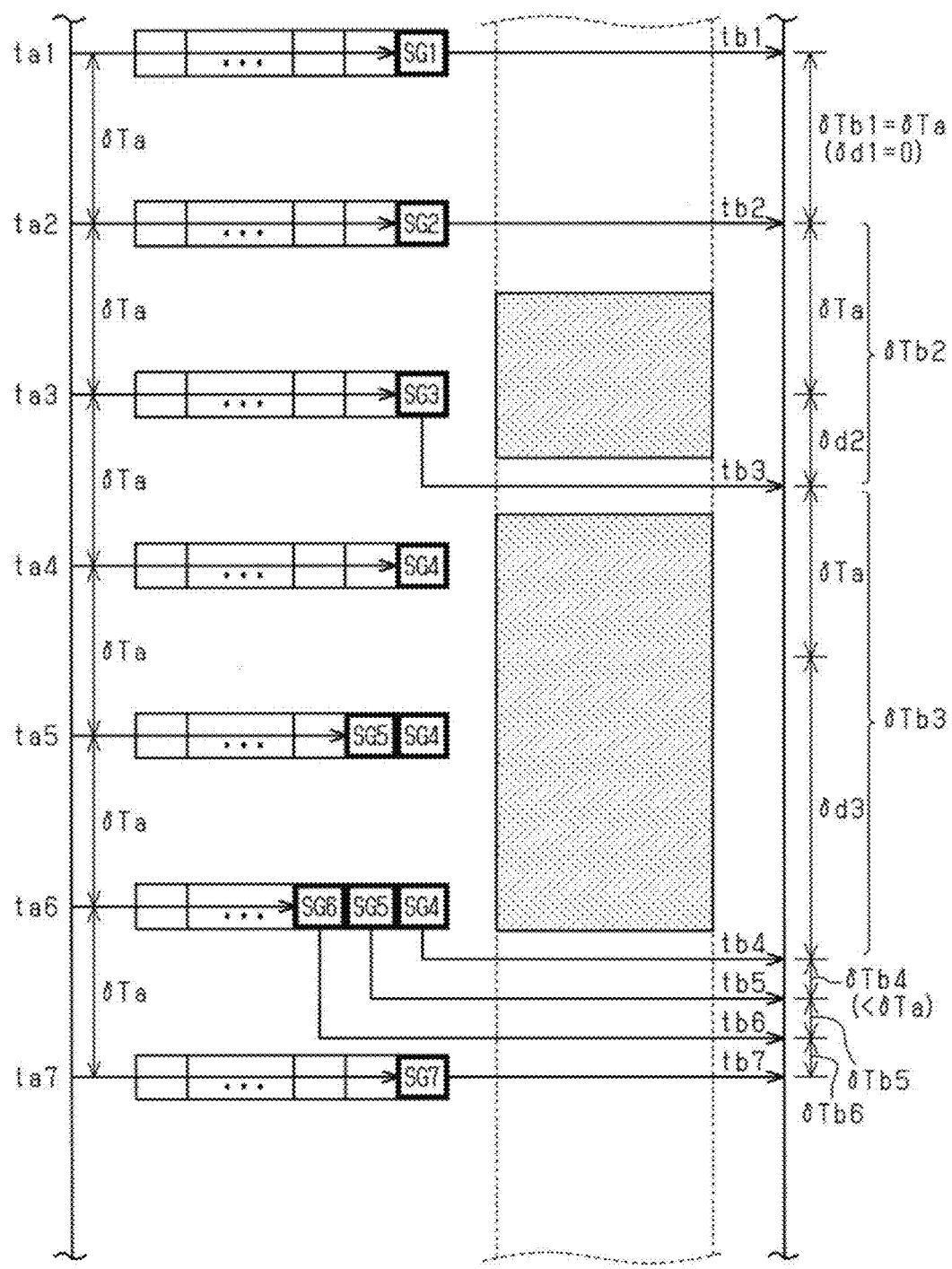
FIG. 10 is a time chart schematically showing a transmission/reception status of the remote operation signal.

Technical functions of the present embodiment will be next described with reference to FIGS. 9 and 10. Each of FIGS. 9 and 10 is a time chart schematically showing a transmission/reception status of the remote operation signal SG. In the figure, ta1 to ta7 each indicate timing (time) when the remote operation signal SG is generated by the remote operation device 30, while tb1 to tb5 each indicate timing (time) when the vehicle communication unit 50 receives the remote operation signal SG. In FIGS. 9 and 10, the transmittable state is indicated by a broken line, while the transmission waiting state is schematically indicated by a dot hatch.

For convenience of explanation, it is assumed that the remote operation signals SG generated at the timing ta1 to the timing ta7 are remote operation signals SG1 to SG7, respectively, and that the generation intervals δTa of the remote operation signals SG are equal to each other. It is also assumed that an initial value of the accumulated delay time Tm is "0".

A first pattern will be initially described with reference to FIG. 9.

As shown in FIG. 9, the first remote operation signal SG1 is generated at the timing tat, and is set for the transmission buffer 42a, The communication environment is in a transmittable state at the timing ta1, wherefore the first remote operation signal SG1 is transmitted to the vehicle communication unit 50 by the remote communication unit 40 without delay. As a result, the vehicle communication unit 50 receives the first remote operation signal SG1 at the timing tb1 which is substantially the same timing as the timing ta1. The forklift truck 20 performs a motion based on the first remote operation signal SG1 at this timing.

Similarly, the second remote operation signal SG2 is generated at the timing ta2, and is set for the transmission buffer 42a, The communication environment is in a transmittable state at the timing ta2, wherefore the second remote operation signal SG2 is transmitted without delay. In this manner, the vehicle communication unit 50 receives the second remote operation signal SG2 at the timing tb2, which is substantially the same timing as ta2. The forklift truck 20 performs the action based on the second remote operation signal SG2 at this timing.

In this case, a first reception interval δTb1, which is the reception interval δTb of the first remote operation signal SG1 and the second remote operation signal SG2, is equal to the generation interval δTa. In this case, a first unit delay time δd1, which is the unit delay time δd associated with the first remote operation signal SG1 and the second remote operation signal SG2, is "0". Accordingly, the accumulated delay time Tm is maintained at "0".

More specifically, when the communication environment is continuously in the transmittable state, the remote operation signal SG is transmitted without is delay each time the remote operation signal SG is set for the transmission buffer 42a. In this case, the unit delay time δd becomes "0". Accordingly, the accumulated delay time Tm does not change.

It is assumed that the communication environment subsequently shifts from the transmittable state to the transmission waiting state as a result of communication other than the communication between the communication units 40 and 50 at timing before the timing ta3.

Thereafter, the third remote operation signal SG3 is generated at the timing ta3, and is set for the transmission buffer 42a, The communication environment herein is in the transmission waiting state at the timing ta3, wherefore the third remote operation signal SG3 is in a standby state without transmission.

Thereafter, before the timing ta4, the communication environment shifts from the transmission waiting state to the transmittable state. As a result, the third remote operation signal SG3 is transmitted, and the remote communication unit 40 receives the third remote operation signal SG3 at the timing tb3. The forklift truck 20 subsequently performs a motion corresponding to the third remote operation signal SG3 at the timing tb3.

In this case, a second reception interval δTb2, which is the reception interval δTb of the second remote operation signal SG2 and the third remote operation signal SG3, is longer than the generation interval δTa. Accordingly, a second unit delay time δd2, which is the unit delay time δd associated with the second remote operation signal SG2 and the third remote operation signal SG3, is a positive value. Thereafter, the accumulated delay time Tm is updated to a value obtained by adding the second unit delay time δd2 to "0", that is, the second unit delay time δd2.

Note that the second reception interval δTb2 is shorter than the communication error period Te. In this case, determination of a communication error is not made. Moreover, it is assumed in this stage that the accumulated delay time Tm is shorter than the delay time threshold Tth. Accordingly, it is not determined that a communication delay has been caused, and the remote operation is normally performed.

It is assumed that the communication environment subsequently shifts from the transmittable state to the transmission waiting state again as a result of communication other than the communication between the communication units 40 and 50 at timing before the timing ta4.

Thereafter, the fourth remote operation signal SG4 is generated at the timing ta4, and is set for the transmission buffer 42a. The communication environment is continuously in the transmission waiting state at the timing ta4, wherefore the fourth remote operation signal SG4 is in a standby state without being transmitted.

The fifth remote operation signal SG5 is generated at the subsequent timing ta5, and is set for the transmission buffer 42a, The communication environment is continuously in the transmission waiting state at the timing ta5 herein, wherefore the fifth remote operation signal SG5 is in a standby state without being transmitted.

Similarly, the sixth remote operation signal SG6 is generated at the timing ta6, and is set for the transmission buffer 42a. The communication environment is continuously in the transmission waiting state at the timing ta6 herein, wherefore the sixth remote operation signal SG6 is in a standby state without being transmitted.

Thereafter, the communication environment shifts from the transmission waiting state to the transmittable state before the timing ta7. As a result, the oldest fourth remote operation signal SG4 in the signals from the fourth remote operation signal SG4 to the sixth remote operation signal SG6 set for the transmission buffer 42a is transmitted, and the remote communication unit 40 receives the fourth remote operation signal SG4 at the timing tb4. The forklift truck 20 subsequently performs a motion based on the fourth remote operation signal SG4 at this timing.

In this case, a third reception interval δTb3, which is the reception interval δTb of the third remote operation signal SG3 and the fourth remote operation signal SG4, is longer than the generation interval δTa. Accordingly, a third unit delay time δd3, which is the unit delay time δd associated with the third remote operation signal SG3 and the fourth remote operation signal SG4, is a positive value. Thereafter, the accumulated delay time Tm is updated to a value obtained by adding the third unit delay time δd3, that is, the sum of the second unit delay time δd2 and the third unit delay time δd3.

Note that the third reception interval δTb3 is shorter than the communication error period Te. In this case, determination of a communication error is not made. Moreover, it is assumed in this stage that the accumulated delay time Tm is shorter than the delay time threshold Tth. Accordingly, it is not determined that a communication delay has been caused, and the remote operation is normally performed.

It is assumed that the communication environment subsequently shifts from the transmittable state to the transmission waiting state again as a result of communication other than the communication between the communication units 40 and 50 at timing before the timing ta7.

Thereafter, the seventh remote operation signal SG7 is generated at the timing ta7, and is set for the transmission buffer 42a. The fifth remote operation signal SG5 is subsequently transmitted by a shift of the communication environment from the transmission waiting state to the transmittable state after the timing ta7. As a result, the vehicle communication unit 50 receives the fifth remote operation signal SG5 at the timing tb5. The forklift truck 20 performs an action corresponding to the fifth remote operation signal SG5 at this timing.

In this case, a fourth reception interval δTb4, which is the reception interval δTb of the fourth remote operation signal SG4 and the fifth remote operation signal SG5, is longer than the generation interval δTa. Accordingly, a fourth unit delay time δd4, which is the unit delay time δd associated with the fourth remote operation signal SG4 and the fifth remote operation signal SG5, is a positive value. Note that the fourth reception interval δTb4 is shorter than the communication error period Te. In this case, determination of a communication error is not made.

Thereafter, the accumulated delay time Tm is updated to a value obtained by adding the fourth unit delay time δd4, that is, the sum of the second unit delay time δd2 to the fourth unit delay time δd4.

It is assumed herein that the accumulated delay time Tm becomes equal to or longer than the delay time threshold Tth as a result of the addition of the fourth unit delay time δd4. In this case, it is determined that a communication delay has been caused, and processing corresponding to the communication delay, such as a warning display and a remote operation stop is performed.

According to this configuration, a warning display or a remote operation stop is performed when a communication delay is caused as a result of the communication waiting state intermittently caused by a crowded communication environment even in a condition of no communication error. In this manner, the operator may recognize that the remote operation is performed in a situation of low responsiveness of the forklift truck 20 to the remote control operation performed for the remote operation device 30, or may stop the remote operation in such a situation.

A second pattern will be next described with reference to FIG. 10.

As shown in FIG. 10, the second pattern is similar to the first pattern until the timing tb4.

It is assumed herein that the communication environment in the second pattern is in the transmittable state after the timing tb4. In this case, the fifth remote operation signal SG5 and the sixth remote operation signal SG6 set for the transmission buffer 42a are sequentially transmitted. The fifth remote operation signal SG5 is received at the timing tb5. The sixth remote operation signal SG6 is received at the timing tb6.

In this case, the fourth reception interval δTb4, which is the reception interval δTb of the fourth remote operation signal SG4 and the fifth remote operation signal SG5, is shorter than the generation interval δTa. Accordingly, the fourth unit delay time δd4, which is the unit delay time δd associated with the fourth remote operation signal SG4 and the fifth remote operation signal SG5, is a negative value. Accordingly, the accumulated delay time Tm decreases.

Similarly, a fifth reception interval δTb5, which is the reception interval δTb of the fifth remote operation signal SG5 and the sixth remote operation signal SG6, is shorter than the generation interval δTa. Accordingly, a fifth unit delay time δd5, which is the unit delay time δd associated with the fifth remote operation signal SG5 and the sixth remote operation signal SG6, is a negative value. In this case, the accumulated delay time Tm decreases.

In addition, the seventh remote operation signal SG7 is generated at the timing ta7, and is set for the transmission buffer 42a. The communication environment is in the transmittable state at the timing ta7, wherefore the seventh remote operation signal SG7 is transmitted without delay. Accordingly, the vehicle communication unit 50 receives the seventh remote operation signal SG7 at the timing tb7 which is substantially the same timing as ta7. In this case, a sixth reception interval δTb6, which is the reception interval δTb of the sixth remote operation signal SG6 and the seventh remote operation signal SG7, is shorter than the generation interval δTa. Accordingly, a sixth unit delay time δd6, which is the unit delay time δd associated with the sixth remote operation signal SG6 and the seventh remote operation signal SG7, is a negative value. Accordingly, the accumulated delay time Tm decreases.

According to this configuration, the remote operation signals SG waiting for transmission are sequentially transmitted when the communication environment improves and comes into the communicable state after temporary continuation of the communication waiting state. In this case, the remote operation signal SG is transmitted at an interval shorter than the generation interval δTa, wherefore the accumulated delay time Tm decreases. Accordingly, when the communication environment improves, the accumulated delay time Tm may be reset (i.e., approximated to "0"). As a result, an erroneous determination that a communication delay has been caused by a temporary communication waiting state may decrease.

According to the present embodiment, communication delay determination is made to determine whether or not a communication delay has been caused each time the remote operation signal SG is received.

For example, the communication delay determination executed at the timing tb2 is a determination based on the accumulated delay time Tm calculated from the first reception interval δTb1 and the generation interval δTa. In this case, the first reception interval δTb1, which is a period required for receiving the two remote operation signals SG1 and SG2, corresponds to a "reception period", while the generation interval δTa, which is a period required for generating the two remote operation signals SG1 and SG2, corresponds to a "generation period". In addition, the accumulated delay time Tm at the timing tb2 corresponds to a "delay time".

In addition, the communication delay determination executed at the timing of tb3 is a determination based on the accumulated delay time Tm calculated from the period from the timing tb1 to the timing tb3 (the period of the sum of the first reception interval δTb1 and the second reception interval δTb2), and the period from the timing ta1 to the timing ta3 (twice the generation interval δTa).

In this case, the period from the timing tb1 to the timing tb3, which is a period required for receiving the first remote operation signal SG1 to the third remote operation signal SG3, corresponds to the "reception period", and the period from the timing ta1 to the timing ta3, which is a period required for generating the first remote operation signal SG1 to the third remote operation signal SG3, corresponds to the "generation period". In addition, the accumulated delay time Tm at the timing tb3 (the sum of the first unit delay time δd1 and the second unit delay time δd2) is a "delay time" corresponding to the difference between the "reception period" and the "generation period".

Similarly, the communication delay determination executed at the timing of tb4 is a determination based on the accumulated delay time Tm calculated from the period from the timing tb1 to the timing tb4 (the sum of the respective reception intervals δTb1 to δTb3), and the period from the timing ta1 to the timing ta4 (three times the generation interval δTa).

In this case, the period from the timing tb1 to the timing tb4, which is a period required for receiving the first remote operation signal SG1 to the fourth remote operation signal SG4, corresponds to the "reception period", and the period from the timing ta1 to the timing ta4, which is a period required for generating the first remote operation signal SG1 to the fourth remote operation signal SG4, corresponds to the "generation period". In addition, the accumulated delay time Tm at the timing tb4 (the sum of the respective unit delay time δd1 to δd3) is a "delay time" corresponding to the difference between the "reception period" and the "generation period".

According to the present embodiment, therefore, the vehicle wireless CPU 53 calculates the accumulated delay time Tm based on the reception period required for receiving the two or more remote operation signals SG and the generation period required for generating the two or more remote operation signals SG, and determines whether or not a communication delay has been caused based on the accumulated delay time Tm. In addition, the number of the remote operation signals SG as targets of the communication delay determination increases each time the remote operation signal SG is received. In other words, the reception period is also considered as a period from reception of one remote operation signal SG to reception of one or a plurality of remote operation signals SG, and the generation period is also considered as a period from generation of the one remote operation signal SG to generation of the one or the plurality of remote operation signals SG.

According to the embodiment detailed above, following advantageous effects are offered.

(1-1) The industrial vehicle remote operation system 10 includes the forklift truck 20 which includes the vehicle communication unit 50, and the remote operation device 30 which includes the remote communication unit 40 performing wireless communication with the vehicle communication unit 50 and is used for remotely operating the forklift truck 20.

The remote operation device 30 includes the remote CPU 33 which repeatedly executes the signal generation process (steps S101 to S104) for generating the remote operation signal SG used for remotely operating the forklift truck 20. The remote communication unit 40 sequentially transmits the remote operation signals SG to the vehicle communication unit 50. The forklift truck 20 operates based on the remote operation signal SG.

The forklift truck 20 (vehicle wireless CPU 53 in the present embodiment) calculates the accumulated delay time Tm which is a delay time corresponding to a difference between a reception period required for receiving a plurality of the remote operation signals SG and a generation period required for generating the plurality of remote operation signals SG (steps S401 to S404). Note that the reception period of the present embodiment is the first reception interval δTb1, the sum of the first reception interval δTb1 and the second reception interval reception interval δTb2, the sum of the first reception interval δTb1 to the third reception interval δTb3, or the like, while the generation period is the generation interval δTa, twice the generation interval δTa, three times the generation interval δTa, or the like.

Thereafter, the vehicle wireless CPU 53 performs a communication delay determination based on the accumulated delay time Tm to determine whether or not a communication delay has been caused (step S405). When it is determined that a communication delay has been caused, the vehicle wireless CPU 53 executes the communication delay handling control (step S406).

According to this configuration, the remote operation signal SG is transmitted from the remote communication unit 40 to the vehicle communication unit 50, and received by the vehicle communication unit 50. Thereafter, the forklift truck 20 operates based on the remote operation signal SG.

The remote operation signal SG generated by the remote operation device 30 herein may be transmitted to the vehicle communication unit 50 with a delay depending on the communication environment. In this case, responsiveness of the forklift truck 20 to a remote control operation performed for the remote operation device 30 may be lowered, in which condition operability may be deteriorated, for example.

According to the present embodiment, however, the communication delay determination is made, and the communication delay handling control is performed when it is determined that a communication delay has been caused based on the communication delay determination. In this manner, it is possible to manage the communication delay.

In particular, according to the present embodiment, the communication delay determination is made using the accumulated delay time Tm which is the difference between the generation period and the reception period associated with a plurality of the remote operation signals SG. Accordingly, accuracy in determining whether or not a communication delay has been caused may improve more than in a configuration which performs the communication delay determination based on only the one remote operation signal SG.

More specifically, the communication delay determination is made based on the generation timing and the reception timing of one remote operation signal SG. This configuration may cause inconvenience that a communication delay is erroneously determined when a communication delay of only the corresponding one remote operation signal SG has been caused for some reason. According to the present embodiment, however, the communication delay determination is made based on the accumulated delay time Tm associated with a plurality of the remote operation signals SG. Accordingly, the above inconvenience may decrease, and accuracy may improve.

Moreover, according to the present embodiment, the remote operation signal SG is adopted as a signal used for the communication delay determination. In this case, the communication delay determination is made based on the delay condition of the remote operation signal SG which is actually used for the remote operation. Accordingly, the communication delay determination suitable for responsiveness of the forklift truck 20 may be achievable, (1-2) The remote operation signal SG includes the remote time information Dt which includes a setting of the generated time ta indicating a time when the remote operation signal SG is generated. The remote CPU 33 sets the generated time ta as the remote time information Dt based on a recognition result obtained by the remote time recognition unit 36 included in the remote operation device 30 (step S104).

The forklift truck 20 (vehicle wireless CPU 53 in the present embodiment) calculates the accumulated delay time Tm which is the difference between the reception period that is based on the received time tb recognized by the vehicle time recognition unit 51 and the generation period based on the generated time ta of the remote time information Dt included in the remote operation signal SG.

This configuration may reduce a drop of accuracy of the communication delay determination even when the time of the vehicle time recognition unit 51 and the time of the remote time recognition unit 36 are different from each other.

Specifically, when the unit delay time δd and the accumulated delay time Tm are calculated by subtracting the generated time ta of the remote operation signal SG obtained by the remote time recognition unit 36 from the received time tb of the remote operation signal SG obtained by the vehicle time recognition unit 51, each of the unit delay time δd and the accumulated delay time Tm includes the time difference between the time recognition units 36 and 51. As a result, the accuracy of the communication delay determination may drop as a result of the time difference between the time recognition units 36 and 51.

According to the present embodiment, however, the accumulated delay time Tm is the difference between the reception period that is based on the received time tb recognized by the vehicle time recognition unit 51 and the generation period that is based on the remote time information Dt included in the remote operation signal SG. This difference is not a difference between times but a difference between periods. In this case, the influence of the time difference between the time recognition units 36 and 51 on the accumulated delay time Tm is small. Accordingly, a drop of accuracy of the communication delay determination caused by the time difference between the time recognition units 36 and 51 may decrease.

(1-3) The vehicle wireless CPU 53 recognizes the generation interval δTa and the reception interval δTb based on the generated time to and the received time tb of the remote time information Dt each time the vehicle communication unit 50 receives the remote operation signal SG (step S401 and step S402). Thereafter, the vehicle wireless CPU 53 calculates the unit delay time δd which is a delay time associated with one remote operation signal SG based on the generation interval δTa and the reception interval δTb (step S403), and updates the accumulated delay time Tm which is an accumulated value of the unit delay time δd each time the unit delay time δd is calculated (step S404).

According to this configuration, the communication delay determination is made based on the communication environment up to the current time each time the remote operation signal SG is received. Accordingly, improvement of the accuracy of the communication delay determination, and improvement of responsiveness to the communication delay may be achievable.

(1-4) The vehicle wireless CPU 53 of the forklift truck 20 determines that a communication error has been caused when the next remote operation signal SG is not received within the communication error period Te after reception of the remote operation signal SG. (step S302). According to the communication delay determination of this configuration, it is determined that a communication delay has been caused when the accumulated delay time Tm is equal to or longer than the delay time threshold Tth. The delay time threshold Tth is shorter than the communication error period Te.

This configuration performs both the communication error determination for determining whether or not transmission and reception of the remote operation signals SG have been normally performed based on transmission and reception of one of the remote operation signals SG, and the communication delay determination for determining whether or not a communication delay has been caused based on transmission and reception of a plurality of the remote operation signals SG. Accordingly, this configuration detects an abnormality that transmission and reception of the remote operation signal SG is difficult to perform, and an abnormality that a delay is continuously caused even in a state where transmission and reception of the remote operation signal SG is performed.

In particular, the delay time threshold Tth is shorter than the communication error period Te. Accordingly, this configuration may detect, in a preferable manner, such a communication delay which is not determined as a communication error but continuously causes a delay of transmission and reception of the remote operation signal SG.

(1-5) The remote communication unit 40 of the remote operation device 30 includes the transmission buffer 42a configured to store a plurality of the remote operation signals SG, Each of the remote CPU 33 and the remote wireless CPU 41 sequentially sets the generated remote operation signals SG for the transmission buffer 42a. The remote communication unit 40 sequentially transmits the remote operation signals SG set for the transmission buffer 42a when the remote operation signals SG are in the transmittable state. Meanwhile, the remote communication unit 40 waits for a shift to the transmittable state without transmission of the remote operation signals SG when the remote operation signals SG are not in the transmittable state.

This configuration waits for a shift to the transmissible state without transmission of the remote operation signal SG when the current state is not the transmittable state as a result of an influence of other communication or the like, that is, in the transmission waiting state of the present embodiment. Even in this case, the remote operation signals SG are sequentially generated. Accordingly, the remote operation signals SG are sequentially set for the transmission buffer 42a. Thereafter, the remote operation signals SG are sequentially transmitted based on a shift to the transmittable state. This configuration reduces generation of the remote operation signals SG that not transmitted and received under the transmission waiting state, thereby reducing such a situation that the forklift truck 20 does not operate in accordance with the remote control operation.

In addition, according to the present embodiment, a small number of the remote operation signals SG are temporarily set for the transmission buffer 42a in a case of a shift to the transmission waiting state as a result of a temporary communication delay. Thereafter, the small number of the remote operation signals SG set during the transmission waiting state are sequentially transmitted by a shift from the transmission waiting state to the transmittable state as a result of cancellation of the communication delay. In this case, the reception period required for receiving the plurality of remote operation signals SG including those signals received after the cancellation of the communication delay is substantially equal to or close to the generation period required for generating the plurality of remote operation signals SG as a whole. Accordingly, an erroneous determination that a communication delay has been caused even after cancellation of the communication delay may decrease.

(1-6) The communication delay handling control may include control for issuing a notification that a communication delay has been caused in the remote operation device 30. According to this configuration, the operator may recognize the presence of the communication delay. Accordingly, the operator may be prompted to take action corresponding to the communication delay, such as a temporary stop of a remote operation and a stop of other communication.

(1-7) The communication delay handling control may include remote operation stop control for stopping a remote operation by the remote operation device 30. According to this configuration, continuation of the remote operation in the presence of the communication delay may decrease, wherefore reduction of an erroneous operation caused by the communication delay may be achievable.

(1-8) The wireless communication format of each of the communication units 40 and 50 is Wi-Fi. According to this configuration, remote operations may be achieved using a general-purpose wireless communication format.

The communication range of normal Wi-Fi herein covers approximately from several tens of meters to several hundreds of meters. In this case, the period required for propagation of the remote operation signal SG is short. On the other hand, Wi-Fi is a general-purpose wireless communication format, and therefore is likely to be also used for other communication. Accordingly, a transmission waiting state is easily caused, and a communication delay may be caused easily. According to the present embodiment, however, a communication delay may be identified in an early stage to handle the communication delay. In this manner, the above inconvenience easily caused by adopting Wi-Fi may be reduced.

(1-9) The forklift truck 20 of the industrial vehicle remote operation system 10 includes the vehicle communication unit 50 configured to receive the remote operation signal SG used for remote operations, and operates in accordance with the remote operation signal SG received by the vehicle communication unit 50. The industrial vehicle remote operation system 10 remotely operates the forklift truck 20 using the remote operation device 30 which includes the remote CPU 33 configured to repeatedly execute a signal generation process for generating the remote operation signals SG, and the remote communication unit 40 configured to sequentially transmit the generated remote operation signals SG to the vehicle communication unit 50.

The reception control processing execution program 54b as an industrial vehicle remote operation program used by the industrial vehicle remote operation system 10 is a program under which the forklift truck 20 (specifically, vehicle wireless CPU 53) executes a communication delay process. This communication delay process includes a process for calculating the accumulated delay time Tm, a process for performing communication delay determination, and a process for performing communication delay handling control. In this manner, the vehicle wireless CPU 53 is allowed to function as a delay time calculation unit, a communication delay determination unit, and a communication delay handling control unit, and offers advantageous effects such as (1-1).

(1-10) The industrial vehicle remote operation method includes a signal generation step in which the remote operation device 30 (specifically, remote CPU 33) repeatedly executes a signal generation process for generating the remote operation signals SG, and a signal transmission step in which the remote communication unit 40 sequentially transmits the generated remote operation signals SG.

The industrial vehicle remote operation method further includes a drive control step in which the forklift truck 20 operates in accordance with the remote operation signal SG, steps S401 to S404 in which the forklift truck 20 (specifically, the vehicle wireless CPU 53) calculates the accumulated delay time Tm, step S405 for performing communication delay determination, and step S406 for performing communication delay handling control. In this manner, advantageous effects such as (1-1) are offered.

Second Embodiment

According to the present embodiment, the communication delay process is different from that of the first embodiment. The communication delay process of the present embodiment will be described with reference to FIG. 11.

Figure 11:
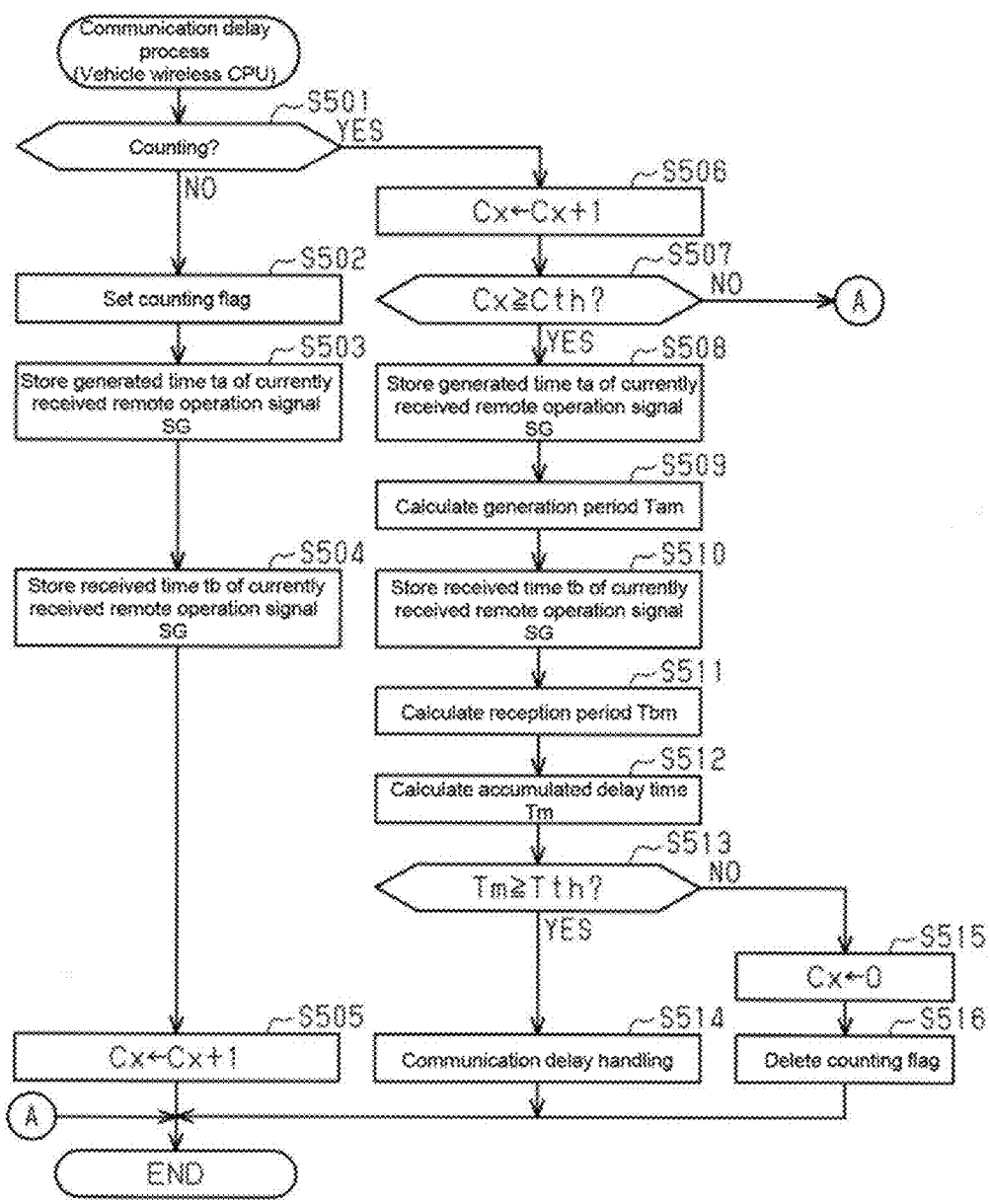
FIG. 11 is a time chart showing a communication delay process according to a second embodiment.

As shown in FIG. 11, the vehicle wireless CPU 53 in step S501 determines whether or not the number of times of reception of the remote operation signal SG is being counted. Specifically, the vehicle wireless memory 54 includes a counting flag storage area for storing a counting flag used for determining whether or not the number of times of reception of the remote operation signal SG is being counted. In step S501, the vehicle wireless CPU 53 determines whether or not the counting flag has been set.

When it is determined that the counting flag has not been set, the vehicle wireless CPU 53 makes a negative determination in step S501, and starts counting the number of times of reception of the remote operation signal SG.

Specifically, the vehicle wireless CPU 53 sets a counting flag in the counting flag storage area in step S502.

Thereafter, in step S503, the vehicle wireless CPU 53 stores the generated time to of the remote operation signal SG having triggered the start of counting in the generated time storage unit 54c based on the remote time information Cat included in the remote operation signal SG having triggered the start of counting (specifically, remote operation signal SG currently received).

In the subsequent step S504, the vehicle wireless CPU 53 stores the received time tb of the remote operation signal SG currently received and having triggered the start of counting in the received time storage unit 54d.

Thereafter, in step S505, the vehicle wireless CPU 53 adds "1" to a reception counter Cx which counts the number of times of reception of the remote operation signal SG, and ends this communication delay process. The reception counter Cx is included in the vehicle wireless memory 54, and set to "0" as an initial value at the count start.

As shown in FIG. 11, when counting has already been started, specifically, when the counting flag has been set, the vehicle wireless CPU 53 makes an affirmative determination in step S501 and advances the process to step S506. In step S506, the vehicle wireless CPU 53 adds "1" to the reception counter Cx.

In the subsequent step S507, the vehicle wireless CPU 53 determines whether or not the reception counter Cx is equal to or larger than a threshold Cth, The threshold Cth may be any value as long as the value is 2 or a natural number equal to or larger than 2. Considering that the reception counter Cx is a value incremented by "1" each time the remote operation signal SG is received, the processing of step S507 is considered as a process for determining whether or not the number of the threshold Cth of the remote operation signals SG have been received from the start of counting of the number of reception of the remote operation signal SG.

When the reception counter Cx is smaller than the threshold Cth, the vehicle wireless CPU 53 ends this communication delay process without change. On the other hand, when the reception counter Cx is equal to or larger than the threshold Cth, the vehicle wireless CPU 53 performs calculation of the accumulated delay time Tm associated with generation or reception of a plurality of (Cth) the remote operation signals SG, and the communication delay determination in steps S508 to S513.

Specifically, the vehicle wireless CPU 53 in step S508 stores the generated time ta of the Cth-th received remote operation signal SG in the generated time storage unit 54c based on the remote time information Dt included in the remote operation signal SG currently received, i.e., the Cth-th received remote operation signal SG from the start of counting including the remote operation signal SG having triggered the start of counting. Note that the Cth-th received remote operation signal SG is also considered as the remote operation signal SG having triggered the communication delay determination.

Thereafter, in step S509, the vehicle wireless CPU 53 calculates a generation period Tam based on storage information in the generated time storage unit 54c. Specifically, the vehicle wireless CPU 53 calculates the generation period Tam by subtracting the generated time ta of the remote operation signal SG having triggered the start of counting (i.e., generated time ta of first received remote operation signal SG) from the generated time ta of the Cth-th received remote operation signal SG.

In the subsequent step S510, the vehicle wireless CPU 53 stores the received time tb of the remote operation signal SG currently received, that is, the Cth-th received remote operation signal SG, in the received time storage unit 54d.

Thereafter, in step S511, the vehicle wireless CPU 53 calculates a reception period Tbm based on storage information in the received time storage unit 54d. Specifically, the vehicle wireless CPU 53 calculates the reception period Tbm by subtracting the received time tb of the remote operation signal SG having triggered the start of counting (i.e., received time tb of first received remote operation signal SG) from the received time tb of the Cth-th received remote operation signal SG.

Thereafter, in step S512, the vehicle wireless CPU 53 calculates the accumulated delay time Tm by subtracting the generation period Tam from the reception period Tbm, and in step S513 determines whether or not the accumulated delay time Tm is equal to or longer than the delay time threshold Tth.

When the accumulated delay time Tm is equal to or longer than the delay time threshold Tth, the vehicle wireless CPU 53 determines that a communication delay has been caused. In this case, the vehicle wireless CPU 53 executes communication delay handling control in step S514 and ends this communication delay process.

On the other hand, when the accumulated delay time Tm is shorter than the delay time threshold Tth, the vehicle wireless CPU 53 determines that no communication delay has been caused. In this case, the vehicle wireless CPU 53 in step S515 sets the reception counter Cx to "0" which is an initial value, in step S516 deletes the counting flag, and ends this communication delay process. In this manner, the counting of the number of reception is restarted in the next communication delay process after the communication delay process having executed the processing of steps S515 and S516. Accordingly, calculation of the accumulated delay time Tm and the communication delay determination are repeatedly executed.

Technical functions of the present embodiment will be described with reference to FIG. 12. Note that counting of the number of reception is started from timing tb1, and the threshold Cth is set to "5" for convenience of explanation.

Figure 12:
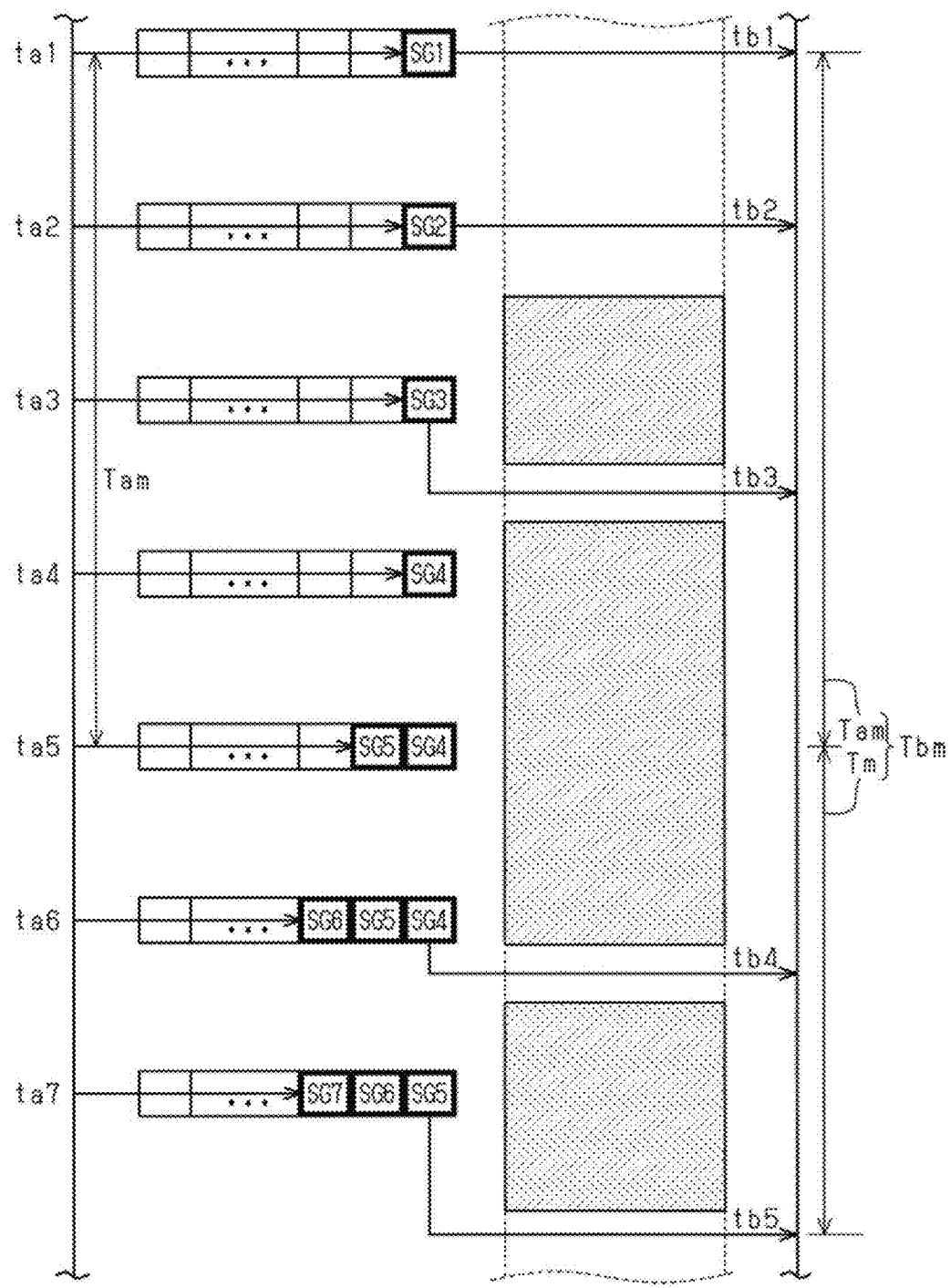
FIG. 12 is a time chart schematically showing a transmission/reception status of a remote operation signal.

As shown in FIG. 12, counting of the number of reception of the remote operation signal SG is started from the timing tb1. In this case, the generated time ta (timing of ta1) of the first remote operation signal SG1 is stored in the generated time storage unit 54c, while the received time tb (timing of tb1) of the first remote operation signal SG1 is stored in the received time storage unit 54d.

Thereafter, the second remote operation signal SG2 to the fifth remote operation signal SG5 are transmitted and received. At the timing tb5 corresponding to the time of reception of the fifth remote operation signal SG5 as the fifth received remote operation signal SG, calculation of the generation period Tam and the reception period Tbm and calculation of the accumulated delay time Tm are performed, and communication delay determination is performed to determine whether or not the accumulated delay time Tm is equal to or longer than the delay time threshold Tth.

According to the present embodiment detailed above, following advantageous effects are offered.

(2-1) The vehicle wireless CPU 53 recognizes the generation period Tam based on the generated time ta of the remote time information Dt included in the remote operation signal SG. Specifically, the vehicle wireless CPU 53 calculates the generation period Tam based on the generated time ta of the remote time information Dt included in the remote operation signal SG having triggered the start of counting, and the generated time ta of the remote time information Dt included in the remote operation signal SG received after a plurality of times of reception of the remote operation signal SG (remote operation signal SG having triggered the communication delay determination).

Moreover, the vehicle wireless CPU 53 recognizes the reception period Tbm based on the received time tb of the remote operation signal SG. Specifically, the vehicle wireless CPU 53 calculates the reception period Tbm based on the received time tb of the remote operation signal SG having triggered the start of counting, and the received time tb of the remote operation signal SG received after a plurality of times of reception of the remote operation signal SG.

Thereafter, the vehicle wireless CPU 53 calculates the accumulated delay time Tm by subtracting the generation period Tam from the reception period Tbm, and performs communication delay determination based on the accumulated delay time Tm. In this manner, the accumulated delay time Tm may be calculated relatively easily, and advantageous effects such as (1-1) are offered. In particular, according to the present embodiment, communication delay determination need not be made each time the remote operation signal SG is received. Accordingly, reduction of a processing load caused by the communication delay determination may be achievable.

The respective embodiments described above may be modified in following manners.

The delay time (accumulated delay time Tm) is the difference calculated by subtracting the generation period ($\delta$Ta, 2$\delta$Ta, 3$\delta$Ta, or the like in the first embodiment, or the generation period Tam in the second embodiment) from the reception period ($\delta$Tb1 $\delta$Tb1+$\delta$Tb2, $\delta$Tb1+$\delta$Tb2+$\delta$Tb3, or the like in the first embodiment, or the reception period Tbm in the second embodiment). However, other configurations may be adopted. The delay time may be any time as long as the time corresponds to the above difference, such as a value obtained by performing a predetermined correction for the difference. In other words, the delay time may be a parameter of a time corresponding to the difference including the difference between the reception period and the generation period.

In addition, the vehicle wireless CPU 53 may be any component as long as the component calculates the accumulated delay time Tm. In this case, direct calculation of the generation period Tarn and the reception period Tbm in the second embodiment is not required. For example, the vehicle wireless CPU 53 may calculate the unit delay time $\delta$d, and cumulatively calculate the accumulated delay time Tm which is a delay time associated with a plurality of the remote operation signals SG as in the first embodiment, or may calculate delay times associated with a plurality of the remote operation signals SG using other methods.

Figure 13:
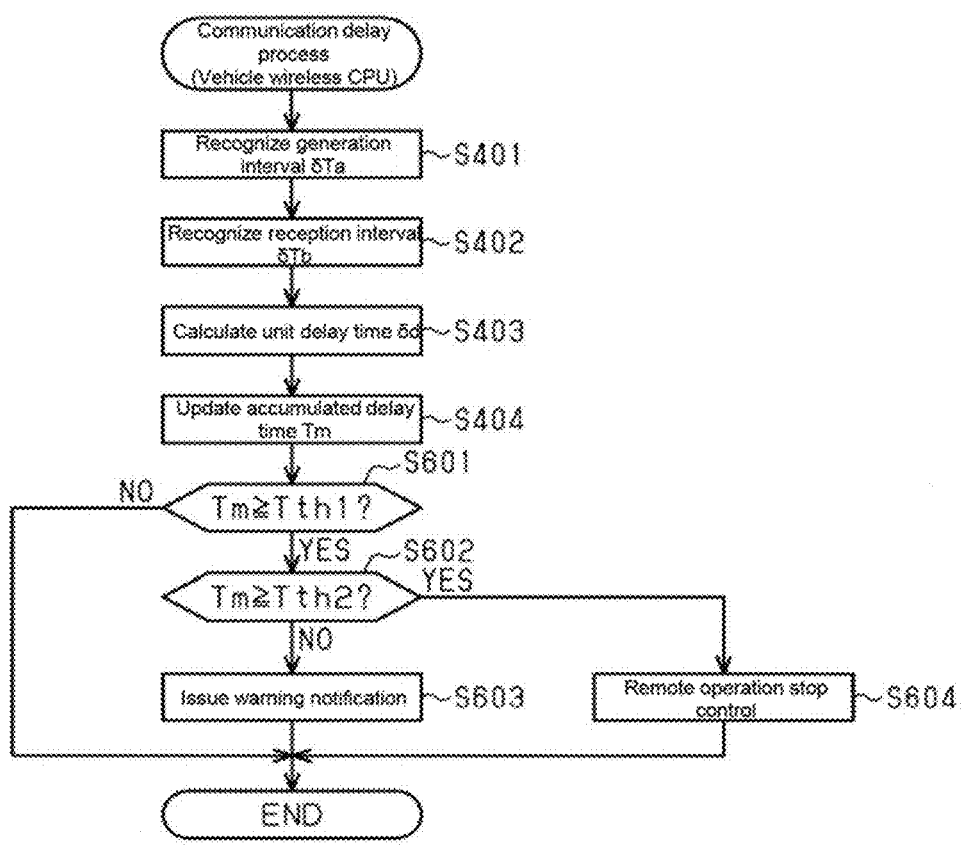
FIG. 13 is a flowchart of a different example of the communication delay process.

The specific manner of the communication delay handling control is not limited to the manners of the respective embodiments, and may be any manners. For example, a warning notification and a remote operation stop control may be combined, For example, as shown in FIG. 13, the vehicle wireless CPU 53 determines whether or not the accumulated delay time Tm is equal to or longer than a first delay time threshold Tth1 in communication delay determination of step S601 after executing the processing of step S404. When the accumulated delay time Tm is shorter than the first delay time threshold Tth1, the vehicle wireless CPU 53 determines that no communication delay has been caused, and ends this communication delay process without change. On the other hand, when the accumulated delay time Tm is equal to or longer than the first delay time threshold Tth1, the vehicle wireless CPU 53 determines that a communication delay has been caused, and advances the process to step S602.

In step S602, the vehicle wireless CPU 53 determines whether or not the accumulated delay time Tm is equal to or longer than a second delay time threshold Tth2 which is longer than the first delay time threshold Tth1. In addition, when the accumulated delay time Tm is shorter than the second delay time threshold Tth2, the vehicle wireless CPU 53 issues a warning notification in step S603, continues the remote operation, and ends this communication delay process. On the other hand, when the accumulated delay time Tm is equal to or longer than the second delay time threshold Tth2, the vehicle wireless CPU 53 performs remote operation stop control in step S604, and ends this communication delay process.

According to this configuration, a warning notification is issued as the communication delay handling control when the accumulated delay time Tm is equal to or longer than the first delay time threshold Tth1 and shorter than the second delay time threshold Tth2. Meanwhile, remote operation stop control is performed as the communication delay handling control when the accumulated delay time Tm is equal to or longer than the second delay time threshold. In this manner, the communication delay handling control executed may be changed in accordance with the communication delay condition.

In particular, according to this different example, the warning notification is issued before a stop of the remote operation. In this case, the operator may recognize a communication delay at a stage prior to the stop of the remote operation, and handle the communication delay. Accordingly, the operator may avoid such a surprise that the remote operation is suddenly stopped due to a communication delay.

In addition, the communication delay handling control may include at least one of the warning notification and the remote operation stop control.

The communication delay handling control is not limited to the warning notification or the remote operation stop control, and may be any control. For example, when both the communication units 40 and 50 have a plurality of communication channels for transmitting and receiving the remote operation signals SG, the communication delay handling control may be a communication channel change.

The warning notification may be performed by the forklift truck 20. In short, the warning notification is preferably performed at least one of the remote operation device 30 and the forklift truck 20. In addition, the warning notification may be issued using a device other than the remote operation device 30 and the forklift truck 20.

The remote operation signal SG is only required to be repeatedly generated during the remote operation. The generation interval δTa is not required to be fixed. The generation interval δTa may vary depending on the processing contents or the like.

In the second embodiment, the vehicle wireless CPU 53 may perform communication delay determination each time the remote operation signal SG is received. In this case, the vehicle wireless CPU 53 may calculate the accumulated delay time Tm based on the generation period Tam and the reception period Tbm associated with the remote operation signal SG currently received and a plurality of (Cth−1) the remote operation signals SG received before the current time, and perform a communication delay determination based on the accumulated delay time Tm, for example.

The specific control mode of the remote CPU 33 is not limited to the mode of each of the embodiments and may be any modes as long as the remote CPU 33 generates the remote operation signal SG based on a remote control operation performed for the remote operation device 30.

For example, the remote CPU 33 may set the operation information D1 and the operation information D2 based on coordinates of the position on the touch panel 31 where the input operation is currently performed, rather than the swipe direction and the swiping amount of the swipe operation.

In addition, when the remote operation device 30 includes a dedicated button instead of the touch panel 31, the remote operation device 30 may adopt an operation of the dedicated button as a remote control operation for the remote operation device 30, for example, instead of or in addition to the input operation to the touch panel 31, In other words, the remote control operation is not limited to the input operation to the touch panel 31 or the first rotation operation, and may be any operations, such as the second rotation operation, and at least one of the input operation to the touch panel 31, the first rotation operation, and the second rotation operation.

In addition, the specific configuration of the traveling operation information D1 and the load-handling operation information D2 may be any information. For example, either the travel speed information Dv or the acceleration information Dα may be omitted.

The calculation manner of the accumulated delay time Tm is not limited to the calculation mode of each of the embodiments, and may be any calculation manner, The communication delay determination is only required to be made based on the accumulated delay time Tm, and is not limited to the determination based on the comparison between the accumulated delay time Tm and the delay time threshold Tth. According to the communication delay determination of the first embodiment, it may be determined that a communication delay has been caused based on a gradual increase in the amount of change in the accumulated delay time Tm at the time of update, for example.

The remote time information Dt includes the setting of the generated time ta. However, other configurations may be adopted. For example, a period from generation of the previous remote operation signal SG to generation of the current remote operation signal SG may be set. In this case, the remote operation device 30 may include a measuring unit which measures the above period instead of the remote time recognition unit 36.

The vehicle communication unit 50 may include, instead of the vehicle time recognition unit 51, a measurement unit which measures a period from reception of the previous remote operation signal SG to new reception of the remote operation signal SG. Accordingly, recognition of time is not essential.

In the first embodiment, the vehicle wireless CPU 53 may calculate the accumulated delay time Tm based on the reception period required for receiving the three or more remote operation signals SG and the generation period required for generating the three or more remote operation signals SG, and determines whether or not a communication delay has been caused based on the accumulated delay time Tm.

The delay time threshold Tth may be equal to the communication error period Te, or may be longer than the communication error period Te. When the delay time threshold Tth is longer than the communication error period Te, communication delay determination is naturally made based on three or more times of transmission and reception of the remote operation signal SG.

The communication error determination may be omitted.

The signal transmission process is not required to be mainly performed by the remote wireless CPU 41, and may be performed by any components as long as the components are included in the remote operation device 30, such as the remote CPU 33. Moreover, the transmission buffer 42a may be included in the remote memory 34. In short, the remote operation device 30 is only required to repeatedly generate the remote operation signals SG, set the generated remote operation signals SG for the transmission buffer 42a, and sequentially transmit the set remote operation signals SG by a shift to a communicable state.

In the respective embodiments, the vehicle wireless CPU 53 is configured to execute the reception control process. However, other configurations may be adopted. The vehicle CPU 25 may execute the reception control process. In addition, the vehicle time recognition unit 51 may be included in any components other than the vehicle communication unit 50 as long as the vehicle time recognition unit 51 is included in the forklift truck 20. Accordingly, the reception control process may be mainly performed by any components as long as the components are included in the forklift truck 20.

In the respective embodiments, the remote communication unit 40 is configured to sequentially transmit the remote operation signals SG set for the transmission buffer 42a by executing the signal transmission process using the remote wireless CPU 41. However, other configurations may be adopted. The remote communication unit 40 is not required to have the configuration implemented by software as described above as long as the remote operation signals SG can be sequentially transmitted in the manner described above. For example, the remote communication unit 40 may be realized by hardware such as a dedicated circuit.

Similarly, the vehicle communication unit 50 is not required to be constituted by software executing the reception control process, and may be configured to perform an operation equivalent to the reception control process by hardware such as a dedicated circuit The storage capacity of the transmission buffer 42a may be different from the storage capacity of the reception buffer 54a, For example, the reception buffer 54a may be a buffer capable of storing one control signal. In this case, the vehicle wireless CPU 53 may update information included in the reception buffer 54a such that a control signal obtained by converting the remote operation signal SG is stored each time the remote operation signal SG is received, The specific manner of control such as the remote operation control process is not limited to the manners described in the respective embodiments, and may be any manners as long as generation and transmission and reception of the remote operation signals SG are performed.

In the respective embodiments, the remote operation targets of the forklift truck 20 are both traveling and load-handling motions. However, the remote operation targets are not limited to these targets and may be only either one of these targets. Moreover, other motions may be adopted as the remote operation targets.

The industrial vehicle is not limited to the forklift truck 20 and may be any vehicles, including a vehicle which has an operation target other than the forks 22.

A storage medium which stores an execution program associated with remote operations, such as the remote operation control execution program 60a and the reception control processing execution program 54b, may be adopted.

The remote operation device 30 (e.g., remote wireless CPU 41) may execute a communication delay process including calculation of the accumulated delay time Tm, communication delay determination, and communication delay handling control. In this case, the vehicle wireless CPU 53 of the forklift truck 20 preferably transmits a specific signal which includes a setting of information for specifying the reception period (e.g., received time tb) to the remote communication unit 40, and the remote wireless CPU 41 preferably recognizes the reception period (reception interval δTb) based on the information included in the specific signal and calculates the accumulated delay time Tm. Note that the remote time information Dt may be eliminated from the remote operation signal SG in this different example.

In addition, when the vehicle communication unit 50 receives the remote operation signal SG, the vehicle wireless CPU 53 may transmit a reply signal indicating reception to the remote communication unit 40, for example. In this case, the vehicle wireless CPU 53 may set information for specifying the reception period as the reply signal, and transmit the reply signal including this information to the remote communication unit 40. In this manner, the remote wireless CPU 41 may recognize the reception period (reception interval δTb) based on the information included in the reply signal, and calculate the accumulated delay time Tm.

Needless to say, the remote operation device 30 includes a necessary component such as the generated time storage unit 54c and the received time storage unit 54d instead of the forklift truck 20 when the remote operation device 30 executes the communication delay process.

The forklift truck 20 may include a signal generation unit which repeatedly generates a vehicle state signal including a setting of a generated time, and a transmission buffer for which the generated vehicle state signals are set. The vehicle communication unit 50 may sequentially transmit the vehicle state signal set for the transmission buffer. In addition, the remote operation device 30 may calculate an accumulated delay time corresponding to a difference between the reception period that is based on the received time of the vehicle state signal received by the remote communication unit 40 and the generation period that is based on the generated time included in the vehicle state signal to determine a communication delay.

Accordingly, the communication delay determination is not required to be mainly executed by the forklift truck 20, and may be executed by the remote operation device 30 or other dedicated devices. Moreover, the signal used for the communication delay determination is not limited to the remote operation signal SG and may be any signals as long as the signals are transmitted and received between the communication units 40 and 50, such as the vehicle state signal described above and a signal for communication delay determination, Note that the vehicle state signal is a signal indicating the state of the forklift truck 20 (e.g., travel speed and presence or absence of an abnormality).

The respective embodiments and the respective other examples may be appropriately combined.

Next, a technical idea or a suitable modification which may occur in the light of the respective embodiments and the respective other examples described above will be hereinafter described.

(1) The signal generation unit preferably generates a remote operation signal corresponding to a remote control operation for the remote operation device.

Note that the remote control operation for the remote operation device may be any operations. For example, the remote control operation may be an operation for an input unit (e.g., touch panel 31 and operation button) provided in the remote operation device, or a rotation operation of the remote operation device.

(2) The industrial vehicle preferably includes a signal converting unit which converts a remote operation signal for wireless communication into a control signal for in-vehicle communication, and a drive control unit which drives the industrial vehicle based on the control signal. Note that the vehicle CPU 25 corresponds to a "drive control unit" in the respective embodiments.

(3) An industrial vehicle remote operation system including: an industrial vehicle that includes a vehicle communication unit configured to perform wireless communication; and a remote operation device that includes a remote communication unit configured to perform wireless communication with the vehicle communication unit, and is used for remotely operating the industrial vehicle, the remote operation device or the industrial vehicle including a signal generation unit configured to repeatedly generate a signal in a state where a remote operation of the industrial vehicle is performed by the remote operation device, the remote communication unit and the vehicle communication unit configured to transmit and receive the signal generated by the signal generation unit, the industrial vehicle remote operation system being characterized by including a delay time calculation unit configured to calculate a delay time corresponding to a difference between a reception period required for the vehicle communication unit to receive a plurality of the signals and a generation period required for generating the plurality of signals, a communication delay determination unit configured to perform a communication delay determination for determining whether or not a communication delay has been caused based on the delay time, and a communication delay handling control unit configured to execute communication delay handling control corresponding to the communication delay when it is determined that the communication delay has been caused in the communication delay determination.

(4) A remote operation device used for remotely operating an industrial vehicle that includes a vehicle communication unit configured to perform wireless communication, the remote operation device including a signal generation unit configured to repeatedly execute a signal generation process for generating a remote operation signal used for a remote operation of the industrial vehicle, and a remote communication unit configured to sequentially transmit the remote operation signal generated by the signal generation unit to the vehicle communication unit by wireless communication, the industrial vehicle operating based on the remote operation signal received by the vehicle communication unit, the remote operation device being characterized by including a delay time calculation unit configured to calculate a delay time corresponding to a difference between a reception period required for the vehicle communication unit to receive a plurality of the remote operation signals and a generation period required for generating the plurality of remote operation signals, a communication delay determination unit configured to perform a communication delay determination for determining whether or not a communication delay has been caused based on the delay time, and a communication delay handling control unit configured to execute communication delay handling control corresponding to the communication delay when it is determined that the communication delay has been caused in the communication delay determination.

DESCRIPTION OF REFERENCE NUMERALS

10 industrial vehicle remote operation system
20 forklift truck
22 forks
25 vehicle CPU
30 remote operation device
36 remote time recognition unit
40 remote communication unit
41 remote wireless CPU
42 remote wireless memory
42a transmission buffer
42b signal transmission processing execution program
50 vehicle communication unit
51 vehicle time recognition unit
52 signal converting unit
53 vehicle wireless CPU
54 vehicle wireless memory
54a reception buffer
54b reception control processing execution program
54c generated time storage unit
54d received time storage unit
SG remote operation signal
Dt remote time information
to generated time
tb received time
δTa generation interval
δTb reception interval
δd unit delay time
Tm accumulated delay time (delay time)
Tth delay time threshold
Tth1 first delay time threshold
Tth2 second delay time threshold
Tam generation period
Tbm reception period
Te communication error period

The invention claimed is:

1. An industrial vehicle remote operation system comprising:
an industrial vehicle that includes a vehicle communication unit configured to perform wireless communication; and
a remote operation device that includes a remote communication unit configured to perform wireless communication with the vehicle communication unit, and is used for remotely operating the industrial vehicle, wherein the remote operation device includes a signal generation unit configured to repeatedly execute a signal generation process for generating a remote operation signal used for a remote operation of the industrial vehicle, the remote communication unit is configured to sequentially transmit the remote operation signal generated by the signal generation unit to the vehicle communication unit;

the industrial vehicle is configured to operate based on the remote operation signal received by the vehicle communication unit, and the industrial vehicle includes:
- a delay time calculation unit configured to calculate a delay time corresponding to a difference between a reception period required for the vehicle communication unit to receive a plurality of the remote operation signals and a generation period required for generating the plurality of remote operation signals;
- a communication delay determination unit configured to perform a communication delay determination for determining whether or not a communication delay has been caused based on the delay time; and
- a communication delay handling control unit configured to execute communication delay handling control corresponding to the communication delay when it is determined that the communication delay has been caused in the communication delay determination.

2. The industrial vehicle remote operation system according to claim 1, wherein
the remote operation signal includes remote time information that includes a setting of generated time of the remote operation signal,
the remote operation device includes a remote time recognition unit that recognizes time,
the generated time is set based on a recognition result obtained by the remote time recognition unit,
the industrial vehicle includes:
- a vehicle time recognition unit configured to recognize time; and
- a received time recognition unit configured to recognize a received time of the remote operation signal based on a recognition result obtained by the vehicle time recognition unit, and
the delay time calculation unit calculates the delay time corresponding to a difference between the reception period that is based on the received time recognized by the received time recognition unit and the generation period that is based on the generated time of the remote time information included in the remote operation signal.

3. The industrial vehicle remote operation system according to claim 2, wherein
the delay time calculation unit includes:
- an interval recognition unit configured to recognize a generation interval and a reception interval of the remote operation signal based on the generated time of the remote time information included in the remote operation signal and the received time recognized by the received time recognition unit each time the vehicle communication unit receives the remote operation signal;
- a unit delay time calculation unit configured to calculate a unit delay time associated with one remote operation signal based on the generation interval and the reception interval that are recognized by the interval recognition unit; and
- an accumulated delay time update unit configured to update an accumulated delay time as the delay time, based on the unit delay time each time the unit delay time is calculated, and
the communication delay determination unit performs the communication delay determination based on the accumulated delay time.

4. The industrial vehicle remote operation system according to claim 2, wherein
the delay time calculation unit includes:
- a generation period recognition unit configured to recognize the generation period based on the generated time of the remote time information included in the remote operation signal; and
- a reception period recognition unit configured to recognize the reception period based on the received time recognized by the received time recognition unit, and
the delay time is calculated based on the reception period and the generation period.

5. The industrial vehicle remote operation system according to claim 1, wherein
the industrial vehicle includes a communication error determination unit configured to determine that a communication error has been caused when a next remote operation signal is not received within a communication error period after the remote operation signal is received, and
the communication delay determination unit is configured to determine that the communication delay has been caused when the delay time is equal to or longer than a delay time threshold that is shorter than the communication error period.

6. The industrial vehicle remote operation system according to claim 1, wherein
the remote operation device includes a transmission buffer that is configured to store a plurality of the remote operation signals and for which the generated remote operation signals are sequentially set, and
the remote communication unit is configured to sequentially transmit the remote operation signals set for the transmission buffer in a transmittable state where the remote operation signals are transmittable, and wait for a shift to the transmittable state without transmission of the remote operation signals in a state other than the transmittable state.

7. The industrial vehicle remote operation system according to claim 1, wherein
the communication delay handling control includes control that issues a notification that the communication delay has been caused in the remote operation device.

8. The industrial vehicle remote operation system according to claim 1, wherein
the communication delay handling control includes remote operation stop control that stops a remote operation by the remote operation device.

9. The industrial vehicle remote operation system according to claim 1, wherein
the communication delay determination unit is configured to determine that the communication delay has been caused when the delay time is equal to or longer than a first delay time threshold,
the communication delay handling control unit is configured to:

issue a notification that the communication delay has been caused as the communication delay handling control, and continues the remote operation by the remote operation device, when the delay time is shorter than a second delay time threshold that is longer than the first delay time threshold; and perform remote operation stop control that stops the remote operation by the remote operation device as the communication delay handling control, when the delay time is equal to or longer than the second delay time threshold.

10. The industrial vehicle remote operation system according to claim 1, wherein a wireless communication format of each of the remote communication unit and the vehicle communication unit is Wi-Fi.

11. An industrial vehicle that includes a vehicle communication unit configured to perform wireless communication with a remote communication unit of a remote operation device configured to repeatedly generate a remote operation signal used for a remote operation, and receive the remote operation signal repeatedly transmitted from the remote communication unit, the industrial vehicle being configured to operate based on the remote operation signal, comprising:

a delay time calculation unit configured to calculate a delay time corresponding to a difference between a reception period required for the vehicle communication unit to receive a plurality of the remote operation signals and a generation period required for generating the plurality of remote operation signals;

a communication delay determination unit configured to perform a communication delay determination for determining whether or not a communication delay has been caused based on the delay time; and a communication delay handling control unit configured to execute communication delay handling control corresponding to the communication delay when it is determined that the communication delay has been caused in the communication delay determination.

12. A computer-readable storage medium storing therein an industrial vehicle remote operation program for use in an industrial vehicle remote operation system configured to perform, by using a remote operation device, a remote operation of an industrial vehicle that includes a vehicle communication unit configured to perform wireless communication and to receive a remote operation signal used for the remote operation, and is configured to operate based on the remote operation signal received by the vehicle communication unit, the remote operation device including a signal generation unit configured to repeatedly execute a signal generation process for generating the remote operation signal, and a remote communication unit configured to perform wireless communication with the vehicle communication unit and sequentially transmit the remote operation signal to the vehicle communication unit, wherein the program causes the industrial vehicle to function as:

a delay time calculation unit configured to calculate a delay time corresponding to a difference between a reception period required for the vehicle communication unit to receive a plurality of the remote operation signals and a generation period required for generating the plurality of remote operation signals;

a communication delay determination unit configured to perform a communication delay determination for determining whether or not a communication delay has been caused based on the delay time; and a communication delay handling control unit configured to execute communication delay handling control corresponding to the communication delay when it is determined that the communication delay has been caused in the communication delay determination.

13. An industrial vehicle remote operation method for remotely operating an industrial vehicle by using a remote operation device that includes a remote communication unit configured to perform wireless communication with a vehicle communication unit included in the industrial vehicle, comprising:

a signal generation step in which the remote operation device repeatedly executes a signal generation process for generating a remote operation signal used for the remote operation of the industrial vehicle;

a signal transmission step in which the remote communication unit sequentially transmits the remote operation signal generated by the signal generation step to the vehicle communication unit;

a drive control step in which the industrial vehicle operates based on the remote operation signal received by the vehicle communication unit;

a delay time calculation step in which the industrial vehicle calculates a delay time corresponding to a difference between a reception period required for the vehicle communication unit to receive a plurality of the remote operation signals and a generation period required for generating the plurality of remote operation signals;

a communication delay determination step in which the industrial vehicle performs a communication delay determination for determining whether or not a communication delay has been caused based on the delay time; and a communication delay handling control step in which the industrial vehicle executes communication delay handling control corresponding to the communication delay when it is determined that the communication delay has been caused in the communication delay determination.

* * * * *